US008856408B2

(12) United States Patent
Riocreux et al.

(10) Patent No.: US 8,856,408 B2
(45) Date of Patent: *Oct. 7, 2014

(54) REDUCED LATENCY BARRIER TRANSACTION REQUESTS IN INTERCONNECTS

(75) Inventors: Peter Andrew Riocreux, Cheadle (GB); Bruce James Mathewson, Papworth Everand (GB); Christopher William Laycock, Sheffield (GB); Richard Roy Grisenthwaite, Guilden Morden (GB)

(73) Assignee: ARM Limited, Cambridge (GB)

( * ) Notice: Subject to any disclaimer, the term of this patent is extended or adjusted under 35 U.S.C. 154(b) by 594 days.

This patent is subject to a terminal disclaimer.

(21) Appl. No.: 12/923,723

(22) Filed: Oct. 5, 2010

(65) Prior Publication Data

US 2011/0087809 A1 Apr. 14, 2011

(30) Foreign Application Priority Data

Oct. 13, 2009 (GB) .................................. 0917946.6
Apr. 30, 2010 (GB) .................................. 1007363.3

(51) Int. Cl.
*G06F 3/00* (2006.01)
*G06F 5/00* (2006.01)
*G06F 13/362* (2006.01)
*G06F 13/364* (2006.01)
*G06F 13/16* (2006.01)

(52) U.S. Cl.
CPC ............ *G06F 13/362* (2013.01); *G06F 13/364* (2013.01); *G06F 13/1621* (2013.01); *G06F 13/1689* (2013.01)
USPC .............................................. 710/58; 710/36

(58) Field of Classification Search
None
See application file for complete search history.

(56) References Cited

U.S. PATENT DOCUMENTS

| 4,833,468 A | 5/1989 | Larson et al. |
| 5,224,214 A | 6/1993 | Rosich |
| 5,274,782 A | 12/1993 | Chalasani et al. |
| 5,459,842 A | 10/1995 | Begun et al. |

(Continued)

FOREIGN PATENT DOCUMENTS

| EP | 1 594 061 | 11/2005 |
| EP | 2 015 167 | 1/2009 |

(Continued)

OTHER PUBLICATIONS

Search Report for UK 0917946.6 dated Jan. 22, 2010.

(Continued)

*Primary Examiner* — Zachary K Huson
(74) *Attorney, Agent, or Firm* — Nixon & Vanderhye, P.C.

(57) ABSTRACT

Interconnect circuitry is configured to provide data routes via which at least one initiator device may access at least one recipient device, the circuitry including at least one input for receiving transaction requests; at least one output for outputting transaction requests; at least one path for transmitting the transaction requests between the input and the output. Control circuitry routes received transaction requests from the input to the output in response to a barrier transaction request. An ordering of at least some transaction requests is maintained with respect to the barrier transaction request within a stream of transaction requests passing along one of the at least one paths, by not allowing reordering of at least some of the transactions requests. The control circuitry includes a response signal generator, the response signal generator is responsive to receipt of the barrier transaction request to issue a response signal.

45 Claims, 18 Drawing Sheets

(56) References Cited

U.S. PATENT DOCUMENTS

| | | | |
|---|---|---|---|
| 5,608,870 | A | 3/1997 | Valiant |
| 5,675,579 | A | 10/1997 | Watson et al. |
| 6,038,646 | A | 3/2000 | Sproull |
| 6,748,518 | B1 | 6/2004 | Guthrie et al. |
| 6,967,926 | B1 | 11/2005 | Williams et al. |
| 7,031,338 | B2 | 4/2006 | Weaver |
| 7,042,448 | B2 | 5/2006 | Kunimatsu et al. |
| 7,500,045 | B2 | 3/2009 | Hofmann et al. |
| 7,526,593 | B2 | 4/2009 | Mandal et al. |
| 7,603,490 | B2 | 10/2009 | Biran et al. |
| 7,610,458 | B2 | 10/2009 | Arimilli et al. |
| 7,984,202 | B2 | 7/2011 | Hofmann et al. |
| 2003/0110340 | A1 | 6/2003 | Butler et al. |
| 2006/0218335 | A1 | 9/2006 | Hofmann et al. |
| 2007/0250668 | A1 | 10/2007 | Arimilli et al. |
| 2008/0168191 | A1 | 7/2008 | Biran et al. |
| 2008/0301342 | A1* | 12/2008 | Hofmann et al. ............. 710/105 |

FOREIGN PATENT DOCUMENTS

| | | |
|---|---|---|
| JP | 2002-510079 | 4/2002 |
| JP | 2006-178866 | 7/2006 |
| JP | 2008-503808 | 2/2008 |
| JP | 2008-535068 | 8/2008 |
| JP | 2010-530571 | 9/2010 |
| WO | WO 99/38085 | 7/1999 |
| WO | WO 2006/102667 | 9/2006 |
| WO | WO 2008/151101 | 12/2008 |
| WO | WO 2009/025104 | 2/2009 |

OTHER PUBLICATIONS

Search Report for UK 1007363.3 dated Aug. 23, 2010.
U.S. Appl. No. 12/923,727, filed Oct. 5, 2010, Riocreux et al.
International Search Report and Written Opinion of the International Searching Authority mailed Dec. 6, 2010 in PCT/GB2010/001819.
Search Report for UK 1007342.7 dated Aug. 20, 2010.
International Search Report and The Written Opinion of the International Searching Authority mailed Apr. 18, 2011 in PCT/GB2010/001822.
Office Action mailed Dec. 26, 2012 in co-pending U.S. Appl. No. 12/923,727.
UK Examination Report dated Dec. 12, 2013 in GB 1007342.7.
Japanese Office Action mailed Dec. 20, 2013 in JP2012-533684 and English translation.
English translation of Japanese Office Action mailed Jan. 7, 2014 in JP2012-533685.
Notice of Allowance mailed Aug. 14, 2013 in co-pending U.S. Appl. No. 12/923,727.
P.E. McKenney, "Memory Barriers: a Hardware View for Software Hackers" Apr. 5, 2009, pp. 1-26.
Oracle, "Handing Memory Ordering in Multithreaded Applications with Oracle Solaris Studio 12" Oracle White Paper, Sep. 2010, 8 pages.
English translation of Japanese Decision of Rejection mailed May 13, 2014 in JP 2012-533684.
Chinese Office Action issued May 5, 2014 and English translation in CN 201080046966.9, 22 pages.
Chinese Office Action issued Aug. 4, 2014 and English translation in CN 201080046421.8, 29 pages.

* cited by examiner

| Type | Response required | Replicates at splits | Requires address | Blocked upstream | Must block at CC split | Must block at RC split | Usage |
|---|---|---|---|---|---|---|---|
| DSB | Yes | Yes | No | Yes | No | No | DSB instruction. Cannot be converted to any other type. |
| DMB global flush | Yes | Yes | No | Yes | No | No | Intentionally blocking DMB instruction. Can be converted to any other DMB type in some circumstances. |
| DMB local flush | Yes | Yes | No | Yes | No | No | Non-blocking DMB that is blocked for structural reasons. Can be converted to any other DMB type in some circumstances. |
| DMB order | No | Yes | No | No | Yes (inside shareability domain) | Yes | Intentionally non-blocking DMB instruction. Can be converted to any other DMB type in some circumstances. |
| Autorejuvenating read/write separator | No | Yes | No | No | Recreated | Recreated | To preserve strict ordering; to prevent hazards where no hazard detection is performed |
| Early unblock flow | No | No | No | No | Yes until only one response outstanding | Yes until only one response outstanding | To prevent premature early unblocking of the last path in a CC region |
| Addressed, order barrier | No | No | Yes | No | No | No | To prevent hazards; for detailed cache maintenance |
| Addressed flush barrier | Yes | No | Yes | Yes | No | No | Supporting looping topologies |

FIG. 20

REDUCED LATENCY BARRIER TRANSACTION REQUESTS IN INTERCONNECTS

This application claims priority to GB Application No. 0917946.6 filed 13 Oct. 2009 and GB Application No. 1007363.3 filed 30 Apr. 2010, the entire contents of which are incorporated herein by reference.

BACKGROUND OF THE INVENTION

1. Field of the Invention

This invention relates to the field of data processing systems. More particularly the invention relates to interconnect circuitry for data processing apparatus, the interconnect circuitry providing data routes via which one or more initiator devices such as a master may access one or more recipient devices such as a slave.

2. Description of the Prior Art

Interconnects are used to provide connections between different components in data processing systems. They provide data routes via which one or more initiator devices may access one or more recipient device. An initiator device is simply a device that generates a transaction request, and therefore may be a master such as a processor or it may be another interconnect. A recipient device is simply a device that receives the transactions and it may be a slave such as a peripheral or it may also be another interconnect.

As systems become more complex with multiple processors communicating with each other and multiple devices, authors writing software for multiprocessor systems need detailed knowledge of the topology and latency of an architecture, in order to write software which ensures consistent behaviour of interacting processes across time. Even with this detailed knowledge this consistency is only achieved with some non-trivial effort and cost to performance.

It would be desirable to provide mechanisms that allowed a programmer to ensure consistent behaviour of interacting processes across time in a generic manner for an arbitrary architecture.

SUMMARY OF THE INVENTION

A first aspect of the invention provides interconnect circuitry for a data processing apparatus, said interconnect circuitry being configured to provide data routes via which at least one initiator device may access at least one recipient device, said interconnect circuitry comprising: at least one input for receiving transaction requests from said at least one initiator device; at least one output for outputting transaction requests to said at least one recipient device; at least one path for transmitting said transaction requests between said at least one input and said at least one output; control circuitry for routing said received transaction requests from said at least one input to said at least one output; wherein said control circuitry is configured to respond to a barrier transaction request to maintain an ordering of at least some transaction requests with respect to said barrier transaction request within a stream of transaction requests passing along one of said at least one paths, by not allowing reordering of at least some of said transactions requests that occur before said barrier transaction request in said stream of transaction requests with respect to at least some of said transaction requests that occur after said barrier transaction request in said stream of transaction requests; wherein said control circuitry comprises a response signal generator, said response signal generator being responsive to receipt of said barrier transaction request to issue a response signal, said response signal indicating to upstream blocking circuitry that any transaction requests delayed in response to said barrier transaction request can be transmitted further.

As systems get more complicated with multiple processors and multiple peripherals it is difficult for a programmer to keep the required relative ordering of transactions without a detailed knowledge of the architecture of the system the program will be executed on. Providing interconnect circuitry that is responsive to barrier transactions provides software authors with a way of ensuring consistency of behaviour independent of the architecture and topology of the system that they are writing the software for.

In particular, providing interconnect circuitry with control circuitry configured to respond to barrier transaction requests to maintain an ordering of at least some of the requests with respect to the barriers means that the author can write software that can operate on the system when he only knows the logical relationship between the producers and consumers of data and not the topologies and latencies of the system they are operating in. In this way the interconnect circuitry allows a programmer to keep relative ordering of transactions regardless of architecture.

In order to control the ordering of transactions sent through interconnects, all transactions that should occur after a barrier transaction could be delayed until a response signal is received indicating that the earlier transactions that these later transactions need to stay behind have completed. However, this can lead to significant delays. This can be addressed by providing the ability to send an early response to a barrier that is blocking in this way. This will allow the delayed transactions to proceed. Such a signal can safely be sent in certain circumstances, which will be elaborated below.

In many embodiments the response signal is sent along an entry path that the barrier transaction request was received on, although in some embodiments the response path may be a different path. The actual paths followed are not important provided that the response signal generated can provide an indication to the upstream blocking circuitry that subsequent transaction can be transmitted further.

A barrier transaction is a transaction that has a property that transactions that it controls must not be reordered with respect to it. Thus, it can be inserted into a stream of transaction requests to maintain the order of the transactions it controls and thereby prevent some transactions being performed before others. Without barriers, authors must have detailed knowledge of the architectural relationships of agents in the system; with barriers they need only know the logical relationships between producers and consumers of data. These relationships do not change if the software is run on a different architecture and therefore use of barriers permits authors to create software that works consistently on all platforms.

In effect barriers allow the hardware and software design to be decoupled thereby making third-party software easier to deploy.

It should be noted that an initiator device is any device that is upstream of the interconnect and supplies transaction requests. Thus, it could for example, be another interconnect or it could be a master. Similarly a recipient device is a device downstream of the interconnect that receives the transaction requests, thus, it could for example be a slave or it could be another interconnect.

In some embodiments said control circuitry further comprises blocking circuitry configured to respond to at least some of said barrier transaction requests to maintain said ordering by delaying transmission of said at least some transaction requests that occur subsequent to said barrier transaction request in said stream of transaction requests until receipt of said response signal clearing said barrier transaction.

In some embodiments said blocking circuitry is responsive to receipt of said barrier transaction to block a path that said barrier transaction is transmitted along to said at least some transaction requests subsequent to said barrier transaction until receipt of a response signal.

The blocking circuitry may retain the ordering by blocking the path that the barrier has been sent down until receipt of a response signal indicating that the path is clear. If there are several paths then the barrier may be duplicated to go down each or at least a subset and responses may be required from all or all but one to allow the blocking to be stopped, this will be described in more detail later.

In some embodiments said response signal generator is located immediately upstream of said blocking circuitry.

The response signal generator and blocking circuitry can be arranged adjacent to each other so that when the barrier reaches these units the paths are cleared so that transactions stalled upstream can be sent further and the exit paths are blocked.

In some embodiments said response signal generator is located at a point of serialisation within said interconnect, beyond which point transaction requests accessing the same location that have passed through the point of serialisation cannot be reordered, said response signal generator being configured to generate said response signal to said barrier transaction request and not to transmit said barrier transaction request further.

If the interconnect contains one or more points of serialisation beyond which transaction requests accessing the same location cannot be reordered, a response can be sent to the barrier, clearing earlier blockings, and the transactions can be transmitted further following the barrier. By recognising the properties of the interconnect at such a point and providing a way of clearing any blockages instigated by the barrier, the interconnect blocks transactions when required and allows them to continue once the potential risks of reordering are no longer present.

In some embodiments, said interconnect comprises a plurality of paths for transmitting said transaction requests between said at least one input and said at least one output, wherein at least some of said plurality of paths are divergent paths diverging from a node, said control circuitry being configured to duplicate and transmit said barrier transaction request along at least some of said divergent paths that said transaction requests are routed along.

In order for the barrier transactions to function correctly when transactions are sent down divergent paths the barrier transaction should be duplicated on at least some of the exit paths. This allows the ordering of the relevant transactions to be maintained with respect to the barrier transaction on each of the paths. If the barrier transaction were not duplicated then a transaction from behind the barrier and a transaction from ahead of the barrier could change places such that the later transaction reaches the exit point first and this might cause errors in the program. Thus, in some embodiments all exit paths have duplicated barrier transaction sent along them, while in others it is a subset of paths, the subset being paths that the transactions controlled by the barriers are themselves sent down.

In some embodiments, said control circuitry comprises said response signal generator and blocking circuitry arranged at said point of divergence, said response signal generator sending a response to said received barrier transaction and said blocking circuitry being configured to delay transmission of said at least some transactions subsequent to said barrier transaction along said at least some of said divergent paths until after receipt of response signals responding to at least all but one of said duplicated barrier transactions.

In some embodiments, the control circuitry is configured to transmit the transactions controlled by the barrier transactions that are subsequent to it further in response to response signals responding to all of the duplicated barrier transactions being received.

Once responses to all of the duplicated barriers have been received all of the paths are safe to send the subsequent transactions down and thus, they can be sent further.

In other embodiments all but one of the response signals trigger the transmission of some of the delayed subsequent transactions that are routed along the divergent path that no response has yet been received on. It has been noted that once all but one of the response signals have been received the exit path that no response signal has been received on is the only path where the previous transactions are possibly still pending and thus, if subsequent transactions are sent down this one path, this path acts like a bisection path and these subsequent transactions cannot overtake the previous transactions and thus, this is the one path that it is actually safe to send subsequent transactions down. Thus, subsequent transactions can be sent down this path while the other paths remain blocked until a response signal is received from the final duplicated barrier. This is quite advantageous as this final path is probably the path with the most traffic as it is the path that no response has been received on and thus, unblocking it early means that the path with the greatest traffic and thus, probably the highest latency, gets to send subsequent transactions earlier and thus, the overall latency of the system can be reduced. When the response signal is received along this final exit path then all of the exit paths are clear and the subsequent transactions can be sent further.

It should be noted that a point of divergence may feed one cross coupled region or it may feed more than one that are independent of each other. In the latter case, each cross coupled region can be treated independently so that a response to all but one of the paths into one of the regions allows this region to be unblocked but has no effect on the other region.

One potential problem with the above scheme is that while only one path at the initial split point (this perhaps being an entry point to a cross coupled region) may not have received a response and therefore this path can be considered to be a bisection path and subsequent transactions sent further, downstream there may be another split point. At this point, there are several further paths and these paths are no longer bisection and thus, the subsequent transactions cannot be safely transmitted further. At this point the subsequent transactions must therefore be blocked.

In order to address this potential problem, in some embodiments, prior to sending the subsequent transactions along the divergent path that no response signal has been received on, a barrier representation is sent along this path first.

This barrier representation enables subsequent circuitry to recognise that transactions subsequent to this barrier representation have been sent before a response to the barrier and thus, a block may be required.

In some embodiments, said control circuitry is responsive to receipt of said representation of said barrier transaction at a point of divergence to transmit a barrier transaction along all of said divergent paths and to block further transmission of said transactions subsequent to said representation of said barrier transaction along said divergent paths until a response to said bather transaction has been received from all but one of said paths and to transmit said representation of said barrier transaction along said one path and allow subsequent transactions to be transmitted along said one path.

Where there is a further point of divergence within the cross-coupled region the control circuitry is responsive to receipt of the representation of a barrier transaction to generate barrier transactions to be sent along all of the divergent paths from this point of divergence and to stall the representation of the barrier transaction and to block the subsequent transactions until after receipt of a response signal from all but one of the paths. When all but one of the responses have been received the representation of the barrier transaction can be sent along the final path and it can be unblocked in a similar way to previously. The other paths will continue blocking until response signals are received from all of the duplicated barriers.

It should be noted that the barrier representation is not duplicated at divergent points but is simply sent down the one path that is unblocked early. Furthermore, it does not require a response signal it is just sent so that future points of divergence know that the transaction subsequent to this representation have been sent before a response to the barrier was received.

In some embodiments, said plurality of paths comprise at least one bisection path that comprises an only communication path between two nodes within said interconnect circuitry, said two nodes comprising an entry node and an exit node to said bisection path; said response signal generator being located at said entry node and being responsive to receipt of said barrier transaction request to transmit said response signal along said entry path; and said blocking circuitry being located at said exit node and being responsive to receipt of said barrier transaction request to block all exit paths that said barrier transaction request is transmitted along to said at least some transaction requests subsequent to said barrier transaction requests.

Within the interconnect there are paths connecting the various initiator devices and recipient devices. Some of these paths form routes that can be considered to be bisection paths in that they are the only link between two nodes within the interconnect circuitry, such that cutting the path will separate the interconnect in two along this path. A node is any point in the circuitry. In such a case, it can be advantageous to un-block paths that have been blocked by the barrier transaction request when it reaches the entry node to a bisection path, by sending a response signal to clear the paths behind. If the response signal generator is at the start of a bisection path then the blocking circuitry may be located at the end of this path as if the transactions enter a bisection path in the correct order, they must exit it in the same order.

Transaction requests travelling along a bisection path can only travel along one route and thus, must maintain the order that they are sent down the path in relative to the barrier. Thus, if the system has been set up so that they arrive at the entry node in the correct order relative to the barrier, once the barrier transaction request is sent down the bisection path the previous paths can be un-blocked allowing the subsequent transaction requests that had been stalled to be transmitted. Thus, rather than waiting for all the previous instructions to have completed before they are transmitted, they can be transmitted along a portion of the interconnect in response to determining that the barrier transaction request has reached the entry node of a bisection path. In this way, the latency associated with the blocking nature of these bather transaction requests can be reduced and the performance of the interconnect circuitry significantly improved.

In some embodiments, said plurality of paths comprise at least two paths running in parallel between said entry node and said exit node said at least two paths being configured to carry related transactions, said control circuitry comprising: said response signal generator at said entry node for generating said response signal for transmission along said entry path said barrier transaction request is received on; and said blocking circuitry located at said exit port, said blocking circuitry being responsive to receipt of said barrier transaction request from one of said at least two paths to block said exit paths to said at least some transactions subsequent to said barrier transaction received from said one of said at least two paths and in response to receipt of said transaction related to said barrier transaction from another of said at least two paths to transmit said barrier transaction along said exit paths.

In some interconnects two nodes are linked by multiple paths but these are the only paths that link them. Provided that any barrier transactions sent down one of the paths has a related barrier transaction sent down the other path then these can be treated in a similar way to the bisection paths, and paths upstream of the entry node can be un-blocked by generating a response signal once the barrier transaction request has been sent along the multiple paths. On receipt of the barrier transaction request at the exit, subsequent transactions received from said one of said at least two paths are delayed, and the bather is sent down the exit paths once both the barrier transaction request and its related transaction request have been received. It should be noted that a barrier sent down either path, could indicate applicability to both reads and writes, but transactions are only delayed down the path that the barrier transaction was received on.

In some embodiments, said plurality of paths comprise two parallel paths, one for transmitting read signals and one for transmitting write signals.

In some interconnects such as the AXI™ interconnect designed by ARM™ of Cambridge UK, there may be multiple paths between nodes, one being a path for read signals and one for write signals. Signals along these two paths are linked, and thus if a barrier transaction is sent down one a related barrier transaction can be sent down the other and the two paths treated as bisection paths as noted above. If, however, the barrier transaction only applies to say a write, then this can be sent down the write channel and no related barrier transaction needs to be sent down the read channel as no transactions travelling along the read channel are subject to the write barrier transaction.

In some embodiments, said response signal generator is responsive to receiving a barrier transaction request relevant to only a read or a write to modify said bather transaction request to apply to both a read and a write before transmitting said barrier transaction request further.

If a write barrier is received then it can be amended to be a read/write barrier transaction so that it can be sent down both paths and an early response signal can then be sent in response to the received barrier transaction request. The exit node should be blocked when one of the barrier transactions arrives at the exit node. At a merge the barrier transaction requests must not be sent further until they have both arrived at the exit node and all transactions that should remain in front of them have been sent.

In some embodiments said response signal generator is located immediately upstream of said blocking signal generator.

The response signal generator and blocking circuitry can be arranged adjacent to each other so that in effect on the barrier reaching these units the entry paths are cleared and the exit paths blocked. This arrangement uses a response signal generator and blocking circuitry to clear entry paths when the earlier transactions have passed and block the exit paths to the subsequent transactions until receipt of response signals clearing these exit paths. In this way the subsequent transactions can proceed through the interconnect in a controlled way and the delay to the system is reduced.

In some embodiments, said interconnect circuitry comprises at least one domain, said at least one domain comprising at least one of said at least one inputs for receiving transaction requests from said at least one initiator device, a domain boundary being arranged such that any merging of transaction requests received from said at least one input occurs within said at least one domain; and said barrier transaction request comprises an indicator indicating whether it applies to said at least one domain; and said control circuitry is responsive to detecting said barrier transaction request comprising said indicator indicating it applies to said at least one domain, being outside of said at least one domain to provide an indication indicating that said barrier transaction is outside of said domain.

It has been recognised that if an interconnect is arranged into domains, wherein domains are selected as being areas of the interconnect within which any merging of transaction requests received from inputs that are within the domain occurs, then barrier transaction requests may be treated differently depending upon whether they are within the domain or outside of it. Thus, it has been found to be advantageous to consider the interconnect as being arranged in domains and for at least some barrier transactions to be marked as applying to a particular domain, then when it is determined that such a barrier transaction request is outside of the domain it applies to, this can be indicated as at this point its barrier behaviour will change. It should be noted that the indicator indicating that the barrier transaction request applies to the domain may in some embodiments be an explicit indicator associated with the request, while in others it may be implicit, the control circuitry being able to determine from the location and type of barrier transaction request that it applies to that domain.

In some embodiments said indication comprises an indicator attached to said barrier transaction request indicating that it is now outside of said domain to which it applies.

In some embodiments an indicator is provided on the barrier transaction request that indicates that it is now outside of the domain. This can be used to determine the different behaviour of the barrier transaction request. For example, it may be that it is no longer blocking once outside of its domain even perhaps in a cross-coupled region.

In other embodiments said indication comprises a response signal issued along an entry path that said barrier transaction request was received on by said response signal generator.

As the domain is arranged such that transactions from the inputs within the domain will merge within that domain then on exit of that domain a response can be sent to the barrier transaction request in some embodiments and the barrier transaction request can be sent further but it will no longer block the subsequent transactions. Thus, the blocking nature of the barrier transaction request is removed early owing to the arrangement of the interconnect and the use of domains.

In some embodiments, said interconnect circuitry comprises a plurality of domains, each of said plurality of domains comprising at least one of said at least one inputs for receiving transaction requests from said at least one initiator device, domain boundaries being arranged such that any merging of transaction requests received from said at least one inputs within one of said domains occur within said one of said domains.

Although, in some embodiments the interconnect circuitry may have a single domain, in other embodiments it has a plurality of domains and provided they are all arranged so that any merging of transaction requests received from inputs within a domain occur within that domains, then they will all have the properties that the barrier transactions behaviour will change on exiting from the domain and this property can be exploited to reduce the latency caused by barriers within the interconnect.

In some embodiments, at least some of said plurality of domains are subsets of larger domains and there is a hierarchy of domains for each input, such that if an input is a member of a domain of a lower hierarchy it is also a member of a domain of a higher hierarchy, and a transaction exits said domain of said lower hierarchy at a same time as, or before it exits said domain of said higher hierarchy.

In some embodiments, the domains are arranged in hierarchy and this can be used to provide further control of the barrier transaction as will be seen later. Domains of a higher hierarchy are larger than, or the same size as those of the lower hierarchy and enclose them, thus transactions exit the lower hierarchy domains at the same time as or before they exit those of the higher hierarchy.

In some embodiments said domains comprise a non-shareable domain containing only one of said inputs and a system domain comprising all of said inputs, and at least one further type of shareable domain, for each input there is a domain hierarchy such that an input within a non-shareable domain is also within said at least one type of shareable domain for said input, an input within said at least one type of shareable domain is also within said system domain for said input.

It may be useful to have non-sharable domains which are only the input and thus, all barriers marked as non-sharable are outside of their domains when they are within the interconnect, thus an indicator that the barrier applies to a non-shareable domain can be used as an indicator that the barrier is outside of its domain. There are other sharable domains and a system domain which comprises all the inputs and is also itself a sharable domain.

In some embodiments, said domains are arranged such that no domain boundary crosses another domain boundary and exit paths from each domain comprise bisection paths, said control circuitry being configured on detecting said barrier transaction request exiting one of said domains to modify said domain indicator such that said domain indicator indicates a domain of a lower hierarchy, said domain indicator indicating a domain of a lowest hierarchy indicating that said barrier has exited said indicated domain.

It may be advantageous to constrain the topology of the system so that domains are constrained in a certain way and the properties of barriers exiting the domains can then be determined. For example, the domains may be arranged in hierarchical levels such that a domain of a lower hierarchical level is contained completely within one of a higher hierarchical level. Furthermore, the exit paths from them are confined to being bisection paths, such that division of such a path would bisect the interconnect. This property enables one to control the domains and the barriers in certain ways as one can be sure that if transactions meet the barrier constraints at the start of a bisection path they will also do so at the end. Thus, if a domain controls the ordering of transactions with respect to barriers within it correctly on exiting the domain they will be in a correct order and the subsequent domain can then maintain the ordering according to its rules.

In effect the domains are arranged so that either all of the transactions subsequent to the barrier are delayed or none. Thus, when the hierarchy level of the domain falls to the lowest level, this is an indication that the barrier is outside of its domain and will no longer be blocking for subsequent transactions. The indicator is in effect a means of allowing control of the barrier transactions without the need to know where in the interconnect one is.

If there is a reconvergent path later in the interconnect then this scheme no longer works as although transactions may leave a domain in the correct order they can be reordered with respect to each other on the reconvergent paths. It should be noted that if transaction requests to a particular address always cross a reconvergent region by the same path then the region is not reconvergent as far as that address is concerned, If this is the case for all addresses then the region is not reconvergent for any address and can be treated as a cross coupled region. There are advantages to having no reconvergent regions and thus, in some embodiments interconnects are designed so that regions are not reconvergent as far as addressed transactions are concerned and thus, although they may appear from the topology to be reconvergent, functionally they act as cross coupled regions.

In some embodiments at least some of said domains are subsets of larger domains, such that there is a hierarchy of domains and no domain is a partial subset of another domain, such that no domain boundary crosses another domain boundary, and exit paths from each domain comprise bisection paths.

In some embodiments the control circuitry is programmable, such that if interconnects are connected together in a way that introduces further cross coupled or functionally reconvergent paths, the control circuitry no longer modifies the domain indicator to indicate that the boundary should apply to a domain of a lower hierarchy at an exit to a domain as the hierarchy may no longer work.

It should be noted that programmability is advantageous for the control circuitry where it controls anything whose behaviour is dependent on whether the path is bisection, cross-coupled or reconvergent. Providing programmability enables the changing of the nature of these paths by subsequent connectivity to be dealt with. In the case of exiting from domains where an exit path is no longer bisection, then the domain crossing functionality, i.e. the modification of the domain indicator needs to be inhibited.

In some embodiments, said interconnect comprises at least one component configured to provide domain dependent behaviour, said interconnect circuitry being configured to mark said at least one component with a mark indicative of at least one domain said at least one component is located within, such that said domain dependent behaviour is determined dependent upon said at least one domain indicated by said mark.

In alternative embodiments, rather than constraining the topology, different domain dependent components are provided with marks indicating which domain the domain dependent behaviour should be determined from. Thus, it may be that if a component is within several domains the mark needs to indicate these several domains and when a barrier transaction request is received it needs to determine which domain this request relates to and determine from the mark what behaviour is therefore required. This arrangement provides a system which is low in latency but is quite complicated to build with the requirement to store lots of marks and to determine from each barrier which domain it is from.

In alternative embodiments, when said at least one component configured to provide domain dependent behaviour is located within at least two domains, said interconnect circuitry being configured to mark said at least one component such that said domain dependent behaviour is determined dependent upon said domain providing a most restrictive barrier behaviour that said at least one component is within.

It may be advantageous in some cases to simplify the marking and processing by simply marking a location that is in more than one domain with the domain providing the most restrictive barrier behaviour. The domain dependent behaviour is then determined from this domain. This domain will be the lowest hierarchy shareable domain that the location is located in. In this way, one can be ensured of correct behaviour but latencies may be higher than is required. However, this is a reasonable compromise between reducing information storage and processing power and reducing latency.

In some embodiments, said at least one component comprises said response signal generator, said response signal generator determining if said barrier transaction request is within a domain indicated by said domain indicator by comparing said domain indicator determined from said mark, and if it is not said response signal generator issuing a response signal to said barrier transaction request.

The domain dependent component may be a response signal generator and it can send a response signal if it determines that the barrier transaction request is outside of the domain indicated by the mark.

In some embodiments said interconnect comprises a plurality of paths for transmitting said transaction requests between said at least one input and said at least one output, wherein at least some of said plurality of paths are divergent paths diverging from a node said control circuitry being configured to determine a location where at least some of said plurality of paths reconverge and to delay said at least some transaction requests subsequent to said barrier transaction requests at a node before said paths diverge and in response to receiving response signals from all of said reconvergent paths to transmit said delayed at least some transaction requests.

One way of dealing with reconvergent paths being introduced to an interconnect, perhaps by connecting it to a further interconnect, is to introduce a block before the paths diverge, such that the transaction requests subsequent to the barrier transaction request are delayed until a response is received from each of the reconvergent paths. Introducing reconvergent paths renders many of the previous assumptions unsafe and thus all barrier instructions should have transactions subsequent to them delayed or blocked until a response is received from each path.

As noted above with respect to reconvergent regions, some transactions to particular addresses may be restrained to pass along a particular route through the reconvergent region and in such a case the reconvergent region is not reconvergent for that address, An interconnect may be constrained so that transactions pass along a particular route to a particular address for all addresses, in such a case any reconvergent region may be treated as a cross coupled region, which may be advantageous owing to the considerable constraints on the system that a reconvergent region imposes.

In some embodiments, said response signal generator is responsive to receipt of a response signal for a barrier transaction request and to receipt of a further barrier transaction request and to no intervening transactions being received between said barrier transaction request and said further barrier transaction request that are subject to said barrier transaction request to: transmit a response signal for both said barrier transaction request and said further barrier transaction request; and to cancel said further barrier transaction request and not transmit it further.

If a barrier transaction follows an earlier barrier transaction with no intervening transactions between them then the further barrier transaction request can be responded to with the response of the earlier one. The further barrier transaction request can then be cancelled. Once again the overheads of the interconnect are improved. This is the case where the properties of the barrier transaction such as function, domain etc. are the same. This can occur either in a bisection region or a cross coupled region. In a cross coupled region, if this is a point of divergence with two paths, one of them being the path with low traffic where no barrier has been received since the last one. Then a response signal to this barrier is sufficient to allow traffic to be sent down the other path as it is then the one path with no response as has been described earlier.

Given the property that if no intervening barrier transactions are received a later barrier transaction can simply be cancelled and the response from the earlier one used as the response to this one, it may be advantageous in certain circumstances to generate a barrier transaction. Then once a response signal has been received from the generated bather transaction, any later barrier transaction can be cancelled. For example, before sending a location to sleep, a barrier transaction request can be generated and sleep mode can be delayed until the response signal is received. This means that if subsequent barrier transactions are received to be sent to the location it does not have to be woken up to deal with them if no other transactions have been received. These subsequent barrier transactions can simply be cancelled and a response sent. This is convenient if a location is in an inactive mode as it avoids having to wake it simply to deal with a barrier transaction request.

Although in the embodiment above the barrier transaction is generated in response to the sleep signal, it may be generated speculatively in advance of the sleep signal, this means that when the sleep signal is received low power mode can be entered quickly.

The location can comprises a number of things such as a portion of an interconnect device, but in some embodiments, said location comprises said one of said at least one recipient device said recipient device comprising a peripheral This property of being able to cancel a later barrier transaction request can be useful when dealing with peripheral devices particularly those that are inactive during long lengths of time.

In some embodiments, said control circuitry is responsive to detection of a barrier transaction request being transmitted to said at least one peripheral device to generate a request signal to a power controller, requesting said at least one peripheral device enter a low power sleep mode.

It may be convenient following a barrier transaction request to send a low power request to a power controller module, as at this point one is aware that if future barrier transaction requests are received the peripheral does not need to be woken up to deal with them, thus it may be a convenient moment for it to enter a low power mode.

In other embodiments, said control circuitry is responsive to detecting said at least one peripheral being idle for a predetermined time to generate said barrier transaction request and to send said barrier transaction request to said at least one peripheral.

Alternatively, the control circuitry could be responsive to detecting a condition not necessarily generated by the peripheral but indicative of it being idle for a certain time to proactively generate the barrier transaction request so that the peripheral can enter low power mode and not be woken by subsequent barrier transactions.

In some embodiments, said at least some transaction requests comprise all transaction requests within said stream of transaction requests.

Although the barrier transaction request may apply to a subset of the transaction requests such as transaction requests with particular properties or transaction requests from particular initiators, in some embodiments it applies to all of them such that all transaction requests subsequent to the barrier transaction are delayed until a response signal clearing the barrier transaction is received.

In some embodiments, said barrier transaction request comprises an indicator indicating whether said barrier is a synchronisation barrier or a memory barrier.

There can be different types of barriers, synchronisation barriers being barriers that are used to ensure that memory accesses due to instructions that are before the barrier in program order are complete, have reached the required point in the system, and any required effects of those transactions have occurred before any transactions that are after the synchronisation barrier in program order are allowed to occur. If such a barrier occurs then the issuer of the barrier will not permit any further transaction until the barrier responses from all end points are received. Thus, in this case all of the at least some subsequent instructions must be delayed at the issuer until completion of all the transactions prior to the synchronisation barrier. It should be noted that in such a case as the issuer will not issue any further transaction requests until a response is received, other transaction requests in the interconnect can overtake this synchronisation barrier, as it will not apply to them. However, once they have overtaken it they may interact with other transaction requests that are controlled by the barrier, at such a point the barrier becomes relevant to them and thus, although they may overtake the barrier, they must then stay ahead of it.

As the synchronisation barriers have different properties to the memory barriers they are marked as such in the transaction request so that the interconnect can respond to them appropriately and differently to how they respond to the other memory barrier transaction requests. A transaction has completed once it has reached its final destination and any architectural side effects have also completed.

In some embodiments said control circuitry is configured not to allow said at least some transaction requests that occur after at least one of said barrier transaction requests to overtake said at least one of said barrier transaction requests and not to allow said at least one of said barrier transaction requests to overtake said at least some transaction requests that occur in front of said at least one of said barrier transaction requests in said stream of transaction requests, said response signal generator being responsive to receipt of said at least one barrier transaction request not to generate a response signal.

The ordering can be maintained by not allowing at least some transaction requests to overtake or be overtaken by the barrier transaction request, thus, it sits in the stream of transaction requests and maintains ordering around it. This behaviour is sometimes referred to as non-blocking behaviour and a response generator will not send a response as there is no blocking of transactions upstream.

Such a barrier transaction request may comprise an indicator indicating that it is a non-blocking barrier transaction request.

The barrier transaction request may be given an indicator to indicate that it is a "non-blocking" barrier and that transaction requests must stay on their respective sides of it. It may be that this behaviour of barrier transaction requests is taken as the default behaviour and if this is the case the barrier transaction request will not need to have a non-blocking indicator. Alternatively, there may be regions where all barriers behave in this way and thus, in such a region the interconnect will treat all barriers as non-blocking.

In some embodiments said control circuitry is configured not to allow said barrier transaction request to overtake said at least some transaction requests that occur in front of said barrier transaction request in said stream of transaction requests.

In general the control circuitry does not allow barrier transaction requests to overtake those at least some transaction requests whose ordering is to be maintained and which are in front of the bather in the transaction stream. In a non-blocking bather the barrier acts to keep the ordering by also not allowing transaction requests behind the barrier from overtaking it. In a system where the at least some transaction requests that are to be kept behind the barrier have been delayed perhaps by blocking circuitry then transaction requests that are behind the barrier can be allowed to overtake it as these are not the transaction requests that are to have their order maintained by the bather as these transaction requests have already been delayed upstream. However, all transaction requests in front of the barrier must remain in front of it, as otherwise when the delayed transaction requests are allowed to proceed in response to a response signal indicating the barrier has arrived at a response signal generator, then this should indicate that all transaction requests in front of the bather have also reached this point.

This nature of the barrier transaction request could be the default behaviour in a system, in fact some systems may only support this behaviour, however, in some embodiments, this behaviour is marked by the at least some of said barrier transaction requests comprising a blocking indicator which indicates that said at least some transactions subsequent to said barrier transaction request have been delayed.

In summary blocking barrier transaction requests allow the interconnect to know that here is a previous portion of the circuitry that has performed blocking and thus, subsequent portions of the circuitry do not need to block subsequent transactions in response to this barrier transaction request. If the barrier transaction is a blocking transaction then the barrier transaction is passed through and no subsequent blocking by delaying of the transactions is performed. This has the advantage not only of allowing little processing within the interconnect of the barrier transaction request but also preventing transactions from other initiators being blocked by these barrier transactions. It has however, the disadvantage of the barrier transaction request causing high latency as the blocking of subsequent transactions occurs early in the system and is not cleared by an early clearing response. However, it can be advantageous in cases where the latency of a master is not important and yet the performance of the interconnect and other masters is. In such cases, blocking early in the interconnect allows the barrier transaction to pass through with no subsequent delaying being performed. It should be noted that the passing through of the blocking barrier transaction and performing no further delaying is only possible where there are no re-convergent paths. If there are re-convergent paths within the interconnect then it is not possible to pass the transaction through without blocking. Where there is a blocking indicator this may be set by the interconnect circuitry itself in response to conditions where it is desirable such as are discussed above. When it sets the indicator it also blocks the at least some subsequent transactions and thus, no later blocking is required unless there is a re-convergent path. If there is a re-convergent path then blocking is performed in response to barrier transactions whether or not the blocking indicator is set.

Reconvergent paths in this context are transaction paths that have a common start point, a split, and a common end point, a merge. They do not include parallel linked paths such as are present in an ARM® AXI system where there may be two paths running between two nodes, one carrying read and the other write transactions. These need not be treated as reconvergent paths because of the way they are implemented which prohibits the reconvergence of transactions sent along the paths.

In some embodiments, said barrier transaction request further comprises a memory barrier indicator and said control circuitry is configured to duplicate barrier transactions at a divergent node at an entry to a reconvergent region and to provide said duplicated barrier transactions with said blocking indicator and to block subsequent transaction requests until receipt of responses from at least one of said duplicated barrier transactions.

Memory barrier indicators indicate that transactions should not be re-ordered with respect to them. They are only concerned with ordering and not the absolute progress of the transaction requests that they control. Thus, in many parts of the interconnect they can be allowed to travel through the interconnect with subsequent transactions travelling after them but not being allowed to overtake them. However, in a re-convergent region where transactions can take different paths and end up at the same node it is important that transactions following different paths behind duplicated barriers do not overtake other barriers, and for this reason at these points these memory barriers become blocking by the use of a blocking indicator. In this way, indicators within the barrier transactions can be used to change their properties at different portions of the interconnect thereby enabling them to hold up fewer transactions and thereby not increase the latency unduly.

In some embodiments, said barrier transaction request comprises a memory barrier indicator and said control circuitry is configured to duplicate barrier transactions at a divergent node at an entry to a cross coupled region and to provide said duplicated barrier transactions with said blocking indicator and to block subsequent transaction requests until receipt of responses from at least one of said duplicated barrier transactions on exit of said cross coupled region, said control circuitry being further configured to delete said blocking indicator from said duplicated barrier transactions on exit of said cross coupled region.

In cross-coupled regions transactions can again travel down different paths to different nodes and transactions from other nodes can travel to these nodes. Thus, it may be advantageous for memory barriers to become blocking in these regions and then on exit of these regions become non-blocking again. In this way, the blocking nature of the transaction is limited to where it is needed and transactions are not held up unduly.

It should be noted that when blocking subsequent transactions are not allowed to enter the region until there is receipt of responses from the barrier transactions that have gone before. It may be that responses are required from all the barrier transactions before the paths can be unblocked. In other embodiments when all but one of the responses have been received the path that no response has been received on is unblocked, in effect early, and the other paths unblocked only when a response from this final path is received.

As has been noted above the properties of cross coupled regions are different to those of bi-section regions and thus, barrier transactions are treated differently. In some embodiments the interconnect is logically decomposed so that functionally parts of a cross-coupled regions behave as a bi-section region. Thus, barriers in this part of the cross-coupled region may be treated as if they were in a bi-section region and it may for example be appropriate to give an early response to a barrier.

In some embodiments, said control circuitry is responsive to said barrier transaction comprising said memory barrier indicator and no blocking indicator to transmit the said subsequent transactions further without requiring any response from said barrier transaction.

If the memory barrier transaction has no blocking indicator then it can simply be passed along a path and no transactions will be allowed to overtake it. This is sufficient to ensure the correct transaction order and transactions can be sent further without waiting for responses.

A second aspect of the present invention provides an initiator device for issuing transaction requests to a recipient device via an interconnect, comprising: a barrier transaction request generator for generating barrier transaction requests indicating to said interconnect that an ordering of at least some transaction requests within a stream of transaction requests passing through said interconnect should be maintained by not allowing reordering of at least some of said transaction requests that occur before said barrier transaction request in said stream of transaction requests with respect to at least some of said transaction requests that occur after said barrier transaction request; wherein said barrier transaction request generator is configured to provide said generated barrier transaction requests with a blocking or a non-blocking indicator; said initiator device being configured: in response to said barrier transaction request generator generating said barrier transaction request with said blocking indicator not to issue said at least some transaction requests that occur after said barrier transaction request to said interconnect until said initiator device has received a response to said blocking barrier transaction request; and in response to said barrier transaction request generator generating said barrier transaction request with said non-blocking indicator to issue said at least some transaction requests that occur after said barrier transaction request to said interconnect.

An initiator device that has a barrier generator can be used to help maintain ordering of transactions that are being sent via an interconnect. Such an initiator may have a barrier generator that can generate either non-blocking or blocking barriers, the generation of a blocking barrier causing the initiator device to not issue further transaction requests until a response has been received. In this way the initiator device can itself have an input into the latency of the interconnect. It can determine that it will suffer the latency itself and not issue further transactions and issue a blocking barrier transaction that will not itself cause significant delays in the interconnect or it can issue a non-blocking transaction and the subsequent transactions so that the initiator device itself proceeds to issue transactions in a normal way but the interconnect will delay other transactions with respect to the non-blocking barrier transaction in order to maintain the required ordering.

A third aspect of the present invention provides a recipient device for receiving transaction requests from an interconnect, said recipient device being configured in response to receiving a barrier transaction request comprising a blocking indicator to send a response to said barrier transaction request; and in response to receiving a barrier transaction request comprising a non-blocking indicator to discard said barrier transaction request and not to send a response.

The recipient device may also be configured to respond to particular types of barrier transactions. Thus, it may respond to blocking barrier transactions and it may not respond to the non-blocking barrier transactions understanding that there is no upstream delaying of transactions and thus, this type of barrier does not require a response.

A fourth aspect of the present invention provides a data processing apparatus comprising an initiator device according to a second aspect of the present invention, a recipient device according to a third aspect of the present invention, and an interconnect according to a first aspect of the present invention.

A fifth aspect of the present invention provides a method for routing data from at least one initiator device to at least one recipient device via interconnect circuitry, said method comprising: receiving transaction requests from said at least one initiator device at at least one input; transmitting said transaction requests along at least one of a plurality of paths towards at least one output; in response to receipt of a barrier transaction request at a response signal generator: issuing a response signal, said response signal indicating to upstream blocking circuitry that any transaction requests delayed in response to said barrier transaction request can be transmitted further.

The above, and other objects, features and advantages of this invention will be apparent from the following detailed description of illustrative embodiments which is to be read in connection with the accompanying drawings.

BRIEF DESCRIPTION OF THE DRAWINGS

FIG. 20 shows a summary of the different sorts of barrier transactions and how they can be converted from one type to another as they enter different regions of the interconnect that have different requirements.

DESCRIPTION OF THE PREFERRED EMBODIMENTS

Figure 1:
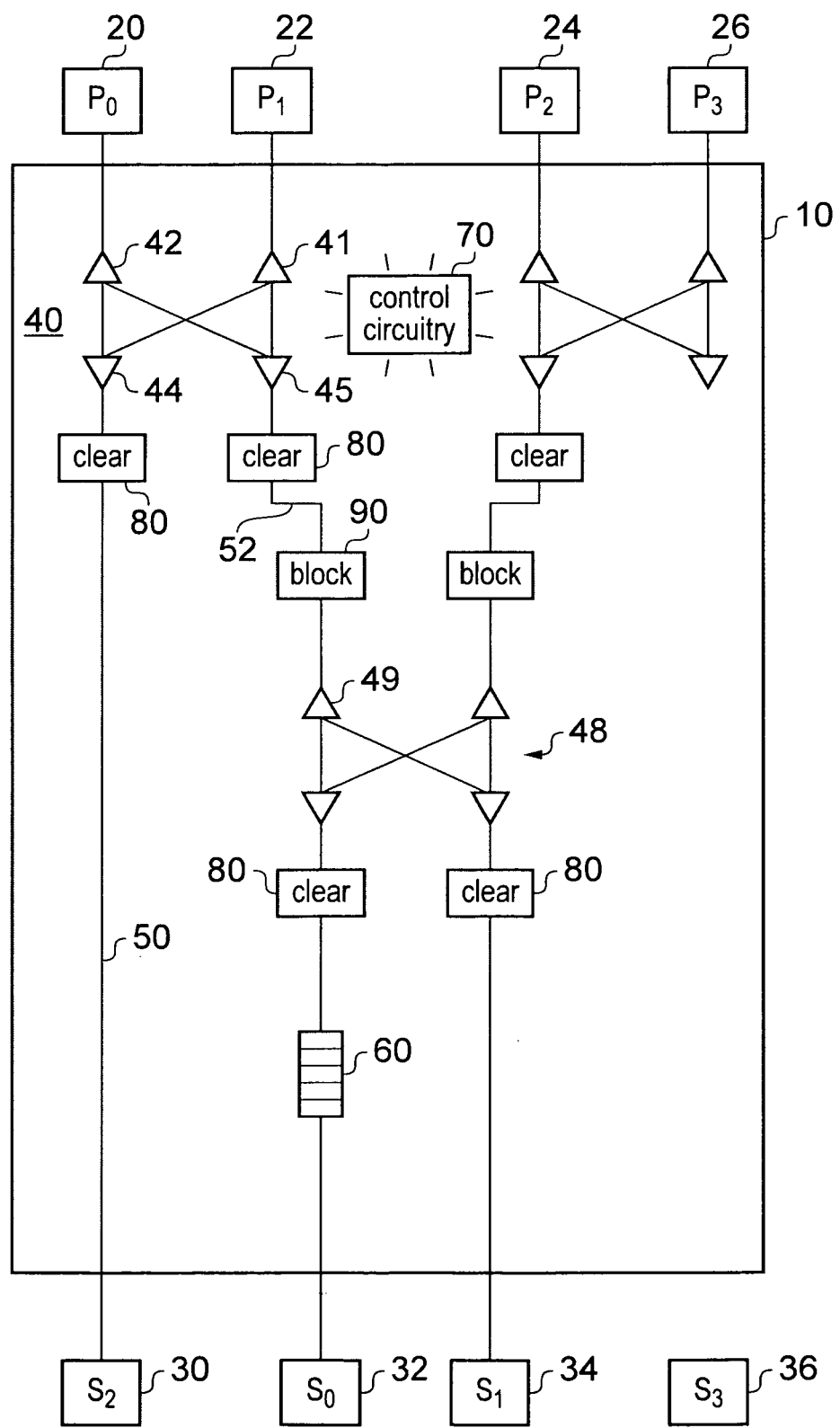
FIG. 1 shows an interconnect according to an embodiment of the present invention.

FIG. 1 shows an interconnect 10 according to an embodiment of the present invention. Interconnect 10 connects a plurality of masters 20, 22, 24 and 26 to a plurality of slaves 30, 32, 34 and 36 via a plurality of paths. These paths may have cross-coupled portions such as is shown for example at 40 where two paths each split into two at respective split points 41 and 42 and merge at merge points 44 and 45. There may also be bisection paths such as is shown for example at 50 These are paths that are the only connection between two nodes in the interconnect, such that cutting the path will in effect divide the interconnect in two.

When transactions pass along these different paths the nature of the paths, that is to say whether they are cross-coupled or bisection will affect the ordering of the transactions. A cross-coupled path for example will start with a split point that will divide the transaction stream into multiple transaction streams, and a transaction that was behind another transaction in the transaction stream before the split point may arrive at its destination before the transaction that it was previously behind arrives at its own destination. Transactions travelling along a bisection path must keep their order unless there is some functional unit that allows reordering such as a re-order buffer as is shown for example at 60. Re-order buffers are used for re-ordering transactions to allow transactions of a higher priority to be delivered to the slave before transactions of a lower priority.

There are also paths that are termed reconvergent wherein paths that are previously split come back together and this can also cause re-ordering within the transaction stream. Interconnect 10 does not have any reconvergent paths.

The fact that transactions can arrive at their destinations in a different order to the order that they were sent in can lead to problems where a subsequent transaction is dependent on a previous transaction and thus, needs it to complete first. For example, if there is a store instruction ahead of a load instruction to a same address in a transaction stream, then it is important that the store is performed before the load, or the load will read an incorrect value. In order to allow a programmer to ensure that the required transactions arrive in the required order, interconnect 10 is configured to respond to barrier transactions within the transaction stream to maintain ordering of transactions within the interconnect with respect to the barrier. Thus, a barrier transaction can be inserted between transactions which should not overtake each other and this will ensure that this does not occur.

The interconnect may respond to these barrier transactions by delaying the transactions that occur in the transaction stream subsequent to the barrier transaction from progressing through the interconnect until a response signal to the barrier transaction has been received. The response signal indicates that it is safe to send a subsequent instruction. It should be noted that a response signal that clears a path might be a signal indicating that the earlier transactions have all completed, or it may simply be a signal indicating that the barrier transaction has passed along a path, if for example the path is a bisection path, or that the barrier has reached a node where an early clearing response signal is sent and blocking is performed again.

The interconnect may also simply send the barrier transaction along the various paths behind the previous transactions so that when the barrier is detected as reaching a certain point the interconnect can be sure that all the previous transactions have already passed through this point. Whether it simply transmits the barrier within the stream, or delays the transactions depends on the nature of the barrier and whether it is a blocking barrier or not.

A blocking barrier is a barrier where the transactions behind it in the transaction stream that it controls have been blocked somewhere upstream, and thus, other transactions may overtake a blocking barrier as they are necessarily not those that need to stay behind it, however, the barrier itself cannot overtake any transaction requests in front of it that it controls. A blocking barrier can be unblocked by an early response unit. This is described in more detail below.

A non-blocking barrier is a barrier where no transaction requests have been blocked and thus, transaction requests that it controls must stay on the correct side of this barrier transaction request. As there is no upstream blocking, it cannot be unblocked by an early response unit. As will become clear later the different nature of the barriers may be indicated by blocking or non-blocking indicators, alternatively a system may only support one type of barriers in which case indicators are not required. Alternatively one barrier may be the default barrier type and in this case only the other type of barrier is provided with an indicator. Alternatively there may be regions of the interconnect where all barriers act as blocking barriers and regions where they all act as non-blocking. In such a case the interconnect may be configured such that barriers carry no indicators but the interconnect will treat them in a certain way dependent on their location within the interconnect.

The progress of the barrier transactions is controlled by control circuitry 70. This is schematically shown as a single block in this figure, however in reality the control circuitry is distributed throughout the interconnect adjacent to the circuitry that it controls. Thus, at each split point for example there will be some control circuitry that ensures at least in some embodiments that when a barrier transaction is received it is duplicated and a duplicate barrier transaction is sent down each exit path from the split point. There may be other embodiments where the duplicated barrier is sent down all but one exit paths, and this will be described later. The control circuitry will be aware that the barrier transaction has been duplicated and thus, may require response signals from each duplicated barrier transaction before it can clear the paths for transmission of the transactions that are subsequent to the original barrier transaction and must remain subsequent to it.

In its simplest form a barrier transaction is issued by a master, for example master 20 and the master 20 then blocks all subsequent transactions until it has a response signal from the interconnect indicating that it can transmit the subsequent transactions. Alternatively the barrier may be issued by the control circuitry immediately on entry to the interconnect. The transactions before the barrier transaction and the barrier transaction are transmitted to the interconnect and control circuitry 70 controls the routing of these transactions. Thus, at split point 42 the barrier transaction is duplicated and it travels to merge points 44 and 45. At this point the transactions are entering bisection paths 50 and 52 and as transactions cannot change their position with respect to a barrier on these paths when the barrier transaction arrives at the start of one of these paths one knows that all the transactions previous to it are ahead of it and will remain ahead of it along that path. Thus, an early response signal can be sent by clearing units 80 and in response to receiving both of these signals the control circuitry at split point 42 sends the early response signal to master 20 which can then unblock the transactions subsequent to the barrier transaction that are controlled by it and transmit them into the interconnect.

By providing an early response unit 80, master 20 is blocked for a much shorter time than had it awaited the response from the slaves indicating that the barrier transactions had reached the slaves and in this way the latency introduced by the barrier transactions is reduced.

The barrier transaction that passes along path 50 exits the interconnect and arrives at slave 30 without travelling along any path other than bisection path 50 and thus, there is no need to block again in response to this barrier transaction as once the barrier has passed clearing unit 80 the transactions in front of it must remain there. However, the barrier transaction that is sent along path 52 reaches a further cross-coupled section 48 and in response to receipt of the barrier transaction at the split point 49 control circuitry 70 associated with this split point duplicates the barrier transaction, sends it down both exit paths and blocks the entry path behind it to transaction requests that occur subsequent to the barrier and that are controlled by it. Thus, these subsequent transactions are stalled in some embodiments by being held in a buffer within the blocking circuitry 90 until a response signal is received to all duplicated barrier transactions. Thus, the duplicated barrier transactions pass through the cross-coupled circuitry 40 and exit the cross-coupled circuitry to join further bisection links 52 and 50. As noted before, a bisection path retains transactions in order relative to the barrier and thus, an early response can be sent from the start of the bisection path by clearing units 80. Blocking circuitry 90 waits to receive a response to the barrier transaction from split point 49. Spilt point 49 duplicates the barrier transaction and sends two barrier transactions further one down each path. Split point 49 does not send a response back to blocking circuitry 90 until it has received a response from each of the two barrier transactions that it has transmitted. In response to this response, blocking circuitry 90 allows any subsequent transactions held in its buffer to be transmitted. As the clearing circuitry is on the last bisection path before exit to the interconnect there is no need for further blocking for some barrier types.

There is as noted previously a re-order buffer 60 on bisection path 52 and this buffer is configured to be responsive to the barriers and does not allow transactions controlled by the barriers to be re-ordered with respect to the barriers.

In the previous description it is assumed that a barrier is there to maintain all the transactions that are subsequent to it behind it. However, in some embodiments, as will be seen in more detail later, the barrier may only need to stop a subset of the subsequent transactions from overtaking it, perhaps those from a particular master or those with a particular function, such as write transactions. In such a case, the control circuitry 70 and blocking circuitry 90 will only delay this subset of transactions and will allow the others to proceed. Furthermore, at a split point if the transactions that are controlled by the barrier will never go down one of the paths, a duplicated barrier does not need to be sent down that path.

In this regard, barriers that are marked as being relevant to write transactions are naturally blocking to further writes, so that no further write is issued until a response is received. Because of this property, the barrier does not need to block reads until a response to the write has been received, prior to the response no further writes may be issued and thus, reads can be issued safely, once a response is received to the write barrier, further writes may be issued and at this point the barrier should be blocking to reads too.

Figure 2:
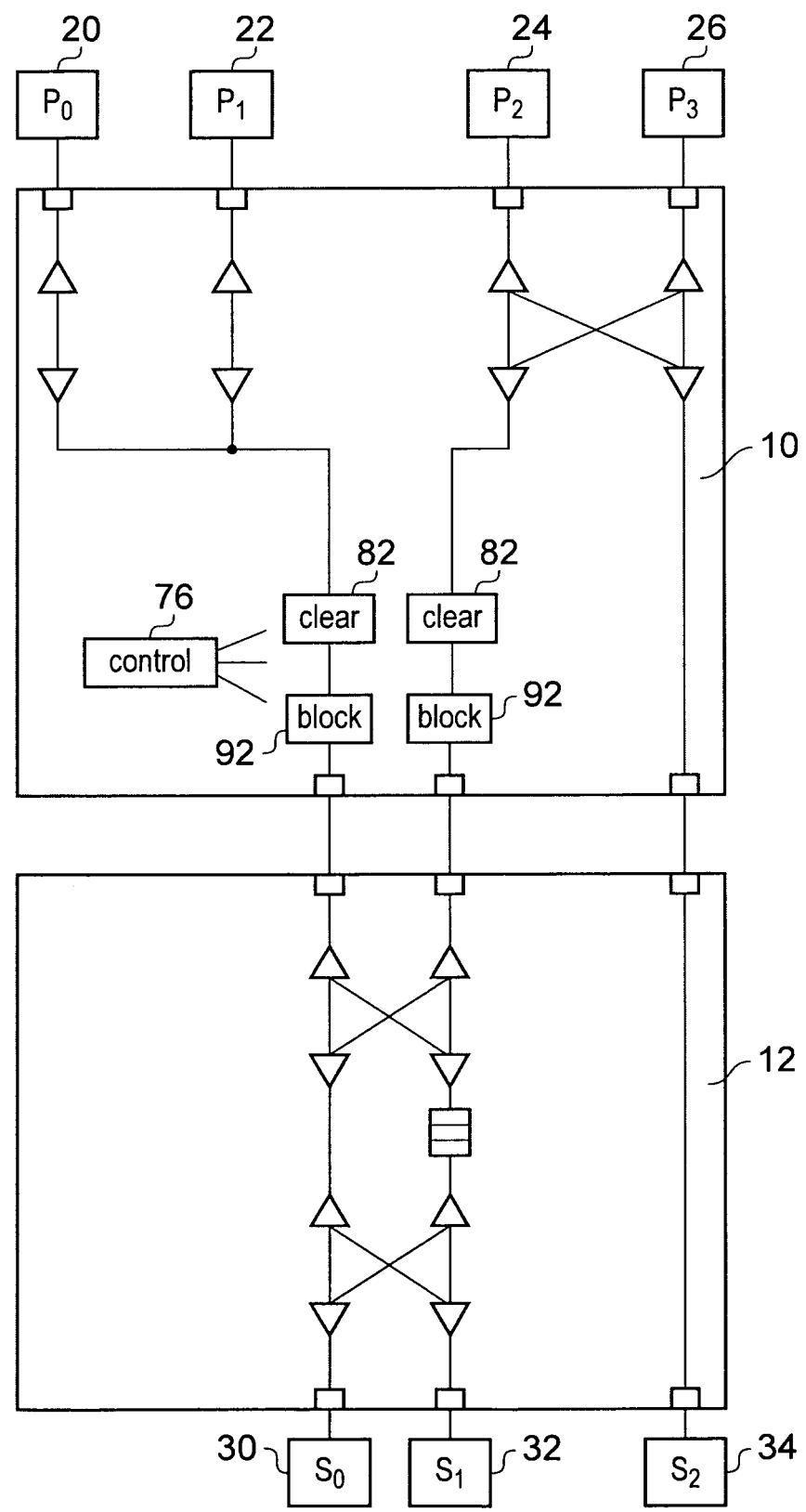
FIG. 2 shows two connected interconnects interconnect according to an embodiment of the present invention.

FIG. 2 shows two interconnects according to an embodiment of the present invention that interconnect masters 20, 22, 24 and 26 to slaves 30, 32 and 34. In this case, interconnect 12 has been connected to interconnect 10 and this introduces re-convergent paths to some of the transactions that exit interconnect 10 and enter interconnect 12. Interconnect 10 if connected directly to slaves can send an early response using clearing units 80 as the subsequent paths are bisection paths and are connected to the exit of the interconnect, then no further blocking is generally required.

However, if rather than going to their destination devices transactions are sent to a further interconnect then it may no longer be appropriate not to block in response to barrier transactions travelling along these paths and if there are further cross coupled paths or as in this case reconvergent paths then it is appropriate on connecting to a further interconnect that introduces such paths to change the way the interconnect early responds and blocks. Thus, in order for the interconnect to be adaptable to different uses, it may comprise programmable blocking circuitry 92 which can be programmed to turn on or off depending on whether the interconnect is connected directly to slaves or to another interconnect with cross coupled or reconvergent paths.

Thus, programmable clear and block circuits 82 and 92 are controlled by control circuitry 76 which in response to interconnect 12 being connected to interconnect 10 blocks any barrier transaction that passes through it. In this way, the subsequent transactions are not allowed to pass until response signals have been received and their ordering is ensured.

As has been mentioned previously barrier transactions block subsequent transactions that are controlled by them, this can be all transactions or a subset of them. The transactions that are controlled by a particular barrier transaction can be determined either from the barrier transaction itself or from the subsequent transactions.

Figure 3:
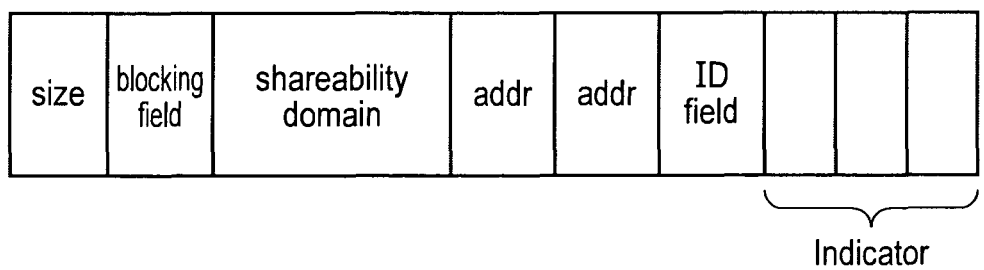
FIG. 3 schematically shows a barrier transaction request according to an embodiment of the present invention.

In embodiments of the invention barrier transactions have been designed to look not unlike other transactions that the interconnect transmits and in this way, interconnects can be configured to process these barrier transactions without the need for much re-design of the components. A schematic version of a barrier transaction is shown in FIG. 3. In this embodiment the barrier transaction request contains address fields in a similar way to a general transaction request, but they are not used except for in addressed barriers that will be described later. It also contains a size field indicating the size of an address range that is covered by an addressed barrier transaction and an indicator field that contains indicator bits indicating various properties of the barrier transaction such as which transactions it applies to.

There are two types of barrier transactions and there are two values of one of the indicator bits that indicate these two different barrier transactions. These two values will indicate to the interconnect both that the transaction is a barrier transaction and also what type of barrier transaction it is. Thus, they may indicate a system data synchronisation barrier (DSB) transaction which is used to separate transactions where the previous transactions must have completed and have reached their final destinations before any transactions that are after such a data synchronisation barrier in program order are allowed to occur. Thus, in response to the indicator bits indicating this sort of barrier the master will block subsequent transactions and there is no possibility of early responses to such transactions and thus, these barrier transactions will cause significant latency.

It should be noted that as the master will block subsequent transactions from entering the interconnect until it receives a response to the system DSB and as the response needs to come from the destination, other transactions can overtake the DSB as there cannot be any transactions that must stay behind the DSB as these have not been issued by the master. However, once they have overtaken the DSB they may interact with other transaction requests that are controlled by the barrier, at such a point the barrier becomes relevant to them and thus, although they may overtake the barrier, if they do so they must then stay ahead of it.

The other type of barrier transactions are data memory barrier transactions DMBs and transactions that are controlled by these barriers should not be allowed to be re-ordered with respect to this barrier. These barriers are only concerned with the ordering of the transactions and not of their progress through the system. Thus, these transactions can use early responses from clearing units and these techniques can be used to reduce the latency induced by these barrier transactions.

There are also other fields in the barrier transaction, one is an identification or ID field to identify the master that generated the transaction, one is a shareability domain field that indicates what shareability domain the barrier pertains to and this will be described in more detail later and one is a blocking indicator which can be set to indicate whether the transaction should be considered as blocking or not. If the indicator is set then this means that blocking has already be performed for this transaction and thus, clearing units and blocking units such as those shown in FIGS. 1 and 2 will simply pass the barrier transaction through and not respond as they know that subsequent transactions are blocked upstream. The utility of this will be described later. It should be noted however, that if there are reconvergent paths such as in the device shown in FIG. 2 then a blocking unit such as blocking unit 92 of FIG. 2 will react to barrier transactions that have their blocking indicator set as well as to those that do not and will block in response to them.

In some embodiments blocking indicators are not present on the barrier transactions, and all barrier transactions are treated as blocking where it is determined that they may need to be.

There may be other fields of control for the barrier transaction that indicates whether it controls only transactions of a particular function. Thus, one may have a barrier transaction that is only pertinent to write transactions.

The address field may be used to indicate barriers that only control transactions to a certain address or range of addresses. In the latter case, the address field stores a base address and the size field the size of the address range. Addressed barriers have the advantage of being able to control a very particular subset of transactions and not slow other transactions. Furthermore, where transactions are duplicated at split points, if it is known that the address or address range cannot be accessed down one or more of the exit paths the addressed barrier does not need to be duplicated, which reduces the latency and barrier handling overheads of the interconnect. As bather transactions have been made to be similar to the other transactions, there is an address field present and thus, it is straightforward to provide the address information in an addressed barrier transaction.

Figure 4:
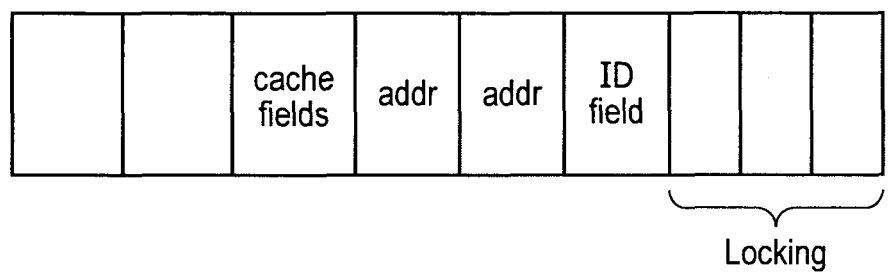
FIG. 4 schematically shows another transaction request.

FIG. 4 shows a transaction that is sent by the interconnect that is not a barrier transaction and as can be seen it is very similar to the barrier transaction in form. This has an indicator field within the locking bits which indicates whether or not the transaction should ignore barrier instruction transactions or not. Thus, marking a field like this in a transaction will allow it to proceed past any blocking automatically. This can be helpful if legacy systems are used with an interconnect that supports barriers.

As mentioned with respect to FIG. 3 there are shareability domains which are a way of segmenting the effect of barriers. This is a further way of improving the latency of the system and will be described in detail with respect to the following figures.

There are a number of different ways of grouping masters and portions of the interconnect into different domains and controlling the bathers and transactions within the domains to ensure that the correct ordering of transactions is maintained while not unduly increasing latency. In this regard, it has been recognised that if certain rules are imposed on the topology of the interconnect relating to the domains, then the bathers will have certain properties that can be exploited to reduce the latency of the barriers. Arranging the domains in particular ways may produce constraints in the permitted topologies of the systems but may also decrease the latency produced by barriers, thus there are advantages and disadvantages to the different possible implementations of domains that are described below.

In all of the arrangements of domains, if a bather transaction is marked as relating to a particular domain, when it is outside of that domain it can always be unblocked except in a reconvergent region. Inside its domain a DMB can be unblocked except in a cross coupled region, while a DSB is always blocking inside its domain. A system DSB is marked as relating to the whole interconnect and thus, is never outside of its domain and is always blocking until a response from its destination is received.

In a first "null" implementation no account is taken of these domains. All barriers are treated as applying to all transactions in all parts of the system. This clearly is low in performance in that latency from the barriers will be high. However, it does permit unrestricted, arbitrary domain membership (even if that membership has no effect) and topology and so can always be built. This is logically equivalent to all domains including all masters in all their domains.

In an alternative "nearly null" implementation there are non-shareable domains that relate to each master and barriers related to these domains are treated differently outside of this domain. As a non-shareable barrier is outside its shareability domain everywhere beyond the input from the master, it can be treated as such in the whole interconnect and therefore be non-blocking in all non reconvergent parts of the interconnect. Other shareability domain barrier transactions are treated as in the null implementation. This is logically equivalent to making the non-shareable domain boundary the issuer or master input, and all other domains contain all other masters.

An alternative "simple" implementation has some restricted topology and improved performance. This approach yields two different solutions depending on the level of restriction that may be accepted.

Three restrictions on shareability domain membership are common to both of these approaches:
1. An observer's non-shareable domain is itself alone.
2. An observer's system shareability domain comprises at least all other observers that it can communicate with directly or indirectly.
3. All members of an observer's inner shareable domain are also members of its outer shareable domain.

The first two of these are the restrictions imposed by [3]. In addition, each of the two solutions has specific topological restrictions and possibly additional shareability domain membership restrictions.

The first of these two implementations requires a restriction that each location is in a single domain, and thus, depends on each location in the interconnect being in only one kind of domain, inner, outer or system. To enable this, an additional shareability domain membership restriction must be enforced:

All members of any shareability domain of any observer must have all other members of that shareability domain as members of their same level of shareability domain. I.e. if observer B is a member of observer A's inner shareable domain, then reciprocally A must be a member of B's inner shareability domain.

The topological restrictions that must be met are:
1. The domain boundary must include all members of the domain
2. Nothing outwith a domain may merge into the domain— i.e. the domain boundary must not include anything that is downstream of anything not inside the domain boundary
3. All domain boundaries must lie on domain bisection links A simple way to think of the domain boundaries in this case is as topographical contour lines representing altitude (where vertical faces are permitted, but overhangs are not). Each master is at the same height, and each shareability domain contour is at the same height as all others of the same type. Vertical cliffs are permitted to allow shareability domains of the different types to be identical, but overhangs, which would allow the crossing of shareability domains are not.

These topological restrictions require that nothing may merge into the domain—neither members of the domain (which would violate restriction 1) nor non-members (which would violate restriction 2) If a split downstream of a member exits the domain and then re-merges into it without also merging with something outwith the domain then the part between exit and re-entry is effectively still in the domain.

The topological and domain membership restrictions combined ensure that, within its shareability domain, a barrier cannot encounter a transaction from an observer outwith that domain and that when it exits the domain it will have merged with all transaction streams from all members of the domain that it will ever merge with. They also ensure that any location that is outside of any inner shareable domain is outside of all inner shareable domains, and if outside of any outer shareable domain is outside of all outer shareable domains.

As a result of this, the requirement for a barrier to be blocking at a split point may be determined by simply comparing the shareability domain of the barrier with the domain type that the split point lies within as the requirement that no member of the shareability domain can merge downstream of the location is met implicitly by the barrier being outwith that domain in such a constrained system.

This mechanism can be implemented by either explicit indication of the barrier being outwith its shareability domain, which would require an explicit detection component at domain exit points, or determination of that status at each relevant split point.

The second of these two implementations allows locations in multiple domains. This implementation depends on the indicated shareability domain of a barrier transaction being modified as it passes through the boundaries of shareability domains so that once it exits its shareability domain it becomes non-blocking by making the transition. As it passes out of an inner or outer shareable domain its indicated domain moves towards non-shareable, and when marked as non-shareable it is known to be outside its domain and so can be non-blocking.

In this case the additional restriction on shareability domain membership is looser:

For any two shareability domains, A and B, either all members of A must also be members of B or all members of B must also be members of A, or both (in which case A and B are identical). In other words, the domain boundaries may not cross.

The same topology restrictions are required:
1. The domain boundary must include all members of the domain To permit maximum flexibility of topology, it must just be possible to decompose the topology components (split and merge) so that the domain boundary may be drawn such that
2. Nothing outwith a domain may merge into the domain— i.e. the domain boundary must not include anything that is downstream of anything not inside the domain boundary
3. The domain boundary lies across domain bisection links Finally, an additional topological restriction is imposed to compensate for problems introduced by the looser restriction on domain membership:
4. No boundary location can be for a different number of domains for different masters excluding masters for which that location is already outwith their outer shareability domain.

Restriction 4 ensures that where a barrier has to be modified as it crosses a domain boundary, it crosses a boundary for all domains it is in. This ensures that the modification operation is not dependent on the originator of the barrier.

If a barrier is modified and acquires non-blocking status, it may of course be unblocked if it is on a bisection link, but in some circumstances it may be unblocked despite being on a cross-coupled link. If the links crossing the domain boundary are domain bisection links that is they are bisection as far as that domain is concerned, i.e. they do not merge with paths from their own domain, only with paths coming from other domains, then the modification of the barrier transaction happens there and the unblocking may also occur from that point.

Restriction 2 may be waived if, in addition to changing the indicated domain towards non-shareable on domain exit, the indicated domain is changed away from non-shareable on domain entry. This requires a domain indicator that does not saturate, or a restriction on the number of domains that may be entered so that saturation does not occur. In addition, this will result in barriers that have entered a domain being blocking of transactions from non-members of that domain due to their increased indicated scope.

Figure 5A:
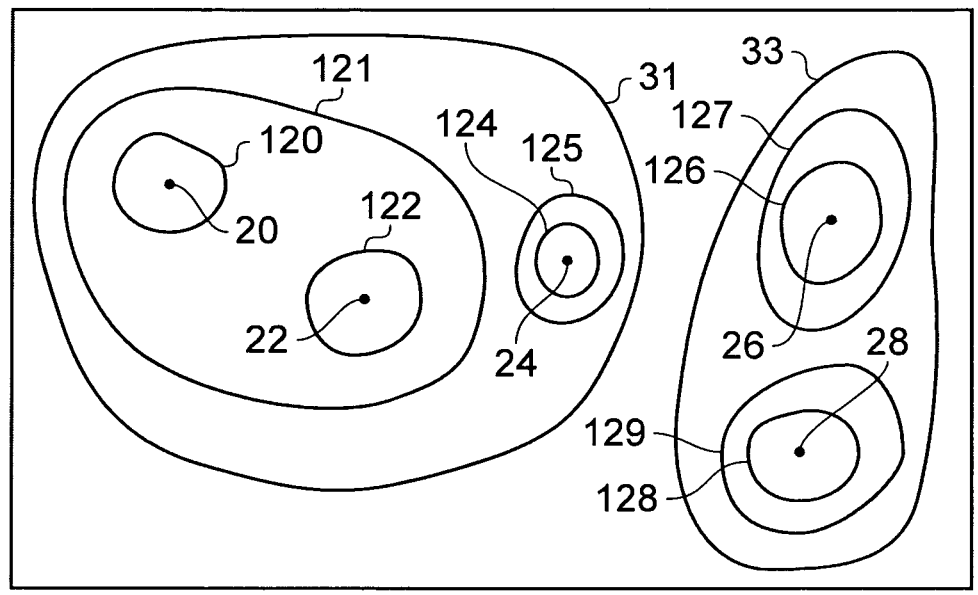
FIG. 5a schematically shows how domains within an interconnect are arranged.

FIG. 5a shows very schematically the above implementation of domains within an interconnect. In this figure the masters are shown within the interconnect although in reality they are of course external to it. Each master 20, 22, 24, 26, 28 has a stream or non-shareable domain 120, 122, 124, 126, 127 immediately surrounding it which is relevant only to transactions generated by itself. There are then some next hierarchical level domains which may encompass a plurality of masters or simply the same master again thus, masters 20 and 22 have their non-shareable domain and then have an inner domain 121 around them, while master 24 has an inner domain 125, master 26 has a non-shareable domain 126 and an inner domain 127 and master 28 has a non-shareable domain 128 and an inner domain 129. There are then outer domains which surround them which in this case are domains 31 and 33. There is then the system domain which is the whole interconnect. As can be seen domains lie completely within each other and do not intercept in any way. There is also a constraint that all exit paths from domains are bisection paths. By constraining the domains in this way one can be sure that transactions leaving these domains will do so in a certain way, and as they leave on bisection paths provided that within the domain the barriers function correctly they will leave in a correct order. This allows control of the barrier transactions with respect to these domains in a particular way.

Figure 5B:
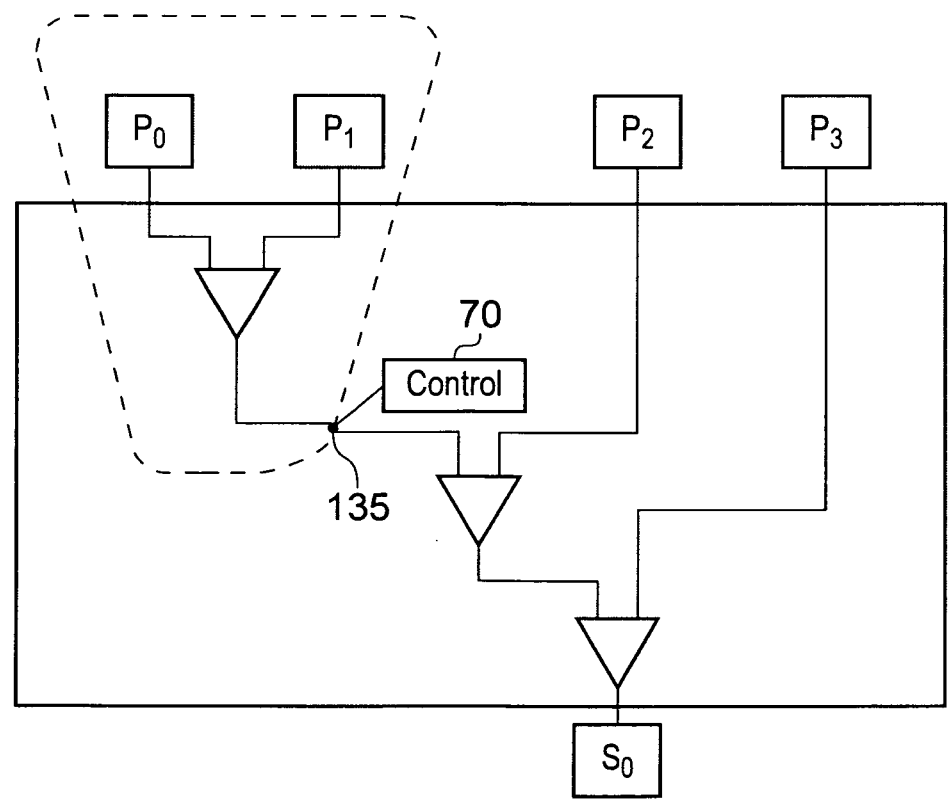
FIG. 5b shows a domain and its exit node in an interconnect according to an embodiment of the present invention.

FIG. 5b shows schematically an exit node 135 to a domain that includes masters p0 and p1. This exit node 135 is controlled by control circuitry 70 and at this node it is known that any barrier transaction and the transactions it controls are in the correct order. Now as noted previously barrier transactions do not necessarily control all transactions but may control transactions generated by particular masters or transactions of a particular function.

In the case of shareability domains, barrier transactions are marked as controlling transactions from particular domains. Thus, a transaction may be marked as a system bather transaction in that it controls all transactions, it may be marked as controlling transactions from a stream or non-shareable domain, from an inner domain or from an outer domain. In any case, when a bather transaction exits a domain it can in this implementation have this hierarchical level reduced so that if it were an outer domain bather when it exited the inner domain it will be reduced to a barrier transaction controlling transactions from an inner domain and when it exits the outer domain it will have the hierarchical level of its control reduced to a non-shareable domain where no transactions need to be delayed by it. This is possible as at this point all the transactions are ordered with respect to this barrier and provided there are no re-convergent paths then the interconnect is sure that the ordering will be correct. It should be noted that system barriers do not change on exiting domains as they always apply to everything everywhere.

It should be noted that if there are reconvergent paths within a domain then any non-blocking barrier must become blocking across the reconvergent region. If a further interconnect that introduces re-convergent paths is connected to an interconnect having domains then the domain system of controlling barriers no longer works. If an interconnect is added that affects the domains and their hierarchy then the system is controlled such that the shareability domain indicator in the barrier transaction is not reduced when it exits the domain.

It should be noted with respect to reconvergent regions, that some transactions to particular addresses may be restrained to pass along a particular route through the reconvergent region and in such a case the reconvergent region is not reconvergent for that address, An interconnect may be constrained so that transactions pass along a particular route to a particular address for all addresses, in such a case any reconvergent region may be treated as a cross coupled region, which may be advantageous owing to the considerable constraints on the system that a reconvergent region imposes.

Owing to the way the interconnect is configured, any barrier transaction within a domain that is not marked as a non-shareable barrier will in effect control transactions of any domain that it encounters as it will not encounter transactions from another domain. A barrier transaction that is marked as a non-shareable barrier will not delay any of the transactions subsequent to it, however, no transaction will be allowed to be reordered with respect to this transaction. In this way, by arranging the interconnect domains in this way and by reducing the hierarchical level of the indicator on exit of the domains a simple way of determining whether the barrier transaction must delay all transactions it meets or none, is used without the need for the control components to know exactly which domain they are in within the interconnect.

A further possible implementation for the domains is the "complex" implementation. This can be used if the topological restrictions or domain membership restrictions above are considered too restrictive. Assuming the requirements on non-shareable and system domain membership are to be retained, the information required is an explicitly enumerated list of what combinations of barrier issuer and shareability domain may be considered non-blocking at that location. Thus, rather than being able to determine the blocking nature of the barrier from the barrier itself as in the implementations described with respect to FIGS. 5a and 5b, the blocking nature of the barrier is determined from the location, the domain information being stored at the location.

This can be done with two lists at each relevant location, one for inner shareable domains and one for outer shareable domains. Each list indicates the set or barrier sources for which the location is outside of that domain. Alternatively, a list could be stored of sources with a two bit value indicating which shareability domains of that source the location is outside.

However the information is represented, it is clearly significantly more complex and more difficult to enable design reuse due to differing requirements to represent the domain information when a system is reused.

Figure 6:
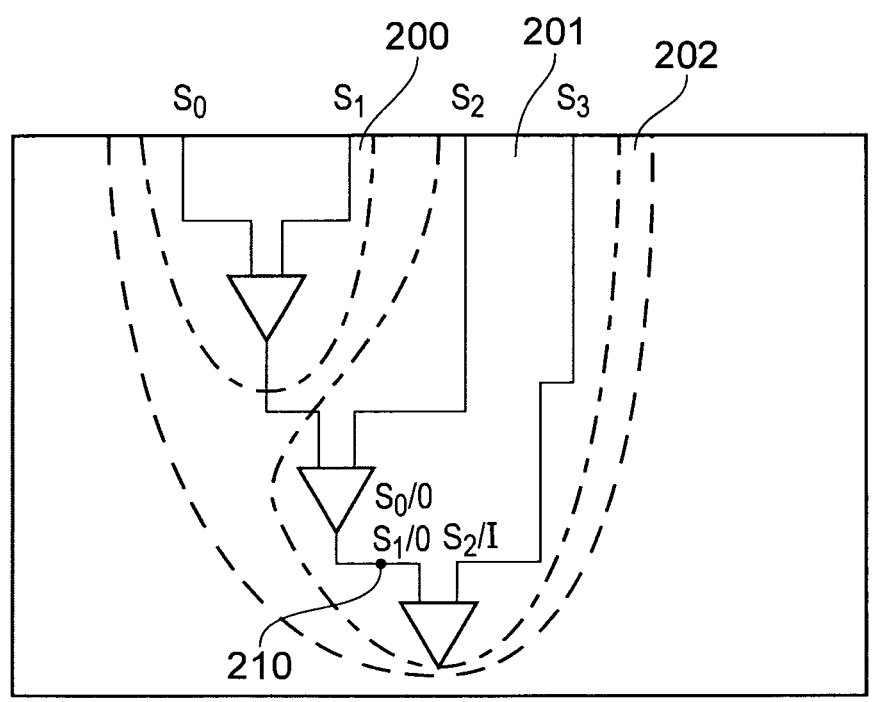
FIG. 6 shows a further arrangement of domains in an interconnect according to a further embodiment of the present invention.

FIG. 6 shows an example of such an interconnect. This interconnect receives transaction requests from four masters, S0, S1, S2 or S3. S0 and S1 are in an inner domain 200, while S2 or S3 are in an inner domain 201 and they are all in an outer domain 202. There are other masters not shown that have other domains.

At location 210 one is in the inner domain for transactions coming from S2 and in the outer domain for transactions coming from S0 or S1. Thus, this location can be marked as such, and when barriers are received it can be determined which domain they relate to and thus, whether or not the barrier is outside of its domain. Thus, a barrier that applies to the S0, S1 inner domain is outside of its domain and it can be marked as such or an early response sent depending on the embodiment. This is clearly quite complicated.

An alternative to this is the conservative complex implementation. This is used if the topological and domain membership freedom of the complex implementation is required but the implementation and re-use issues must be avoided. In this case it is possible to make every component which must exhibit domain-location-specific behaviour consider itself to be in a particular level of domain and achieve correct behaviour. If the component considers itself to be in the smallest domain of any that it actually lies within then it will be conservative (yet correct) in its behaviour for barriers that are actually outside their domain and correct for those that are within their domain. In this regard it should be noted that the properties of barriers, domains or transactions can be changed where that may enable them to be treated more efficiently provided they are changed to be more restrictive. Thus, a barrier that is marked as inner can be treated as an outer barrier and a transaction that is marked as applying to an outer domain can be marked as applying to the inner domain.

With this approach, the components that need to be domain aware can simply be programmed or configured to have a single domain (with a safe default of inner domain membership, this can be used on power up).

Thus, in this implementation a location within the domains is marked as having the properties of the domain with the most restrictive behaviour it is a member of, which is the domain of the lowest hierarchical level excluding the non-shareable domain. Barrier transactions at that location are then treated as being within such a domain. In such an arrangement domains are allowed to be a partial subset of other domains. In this arrangement rather than changing the marking on a barrier as it exits domains in order to adjust the blocking behaviour of the barrier without the need to know where in the interconnect one is, locations in the interconnect are marked as being in a particular domain, depending on the lowest hierarchical or smallest shareable domain they are located in.

In the example of FIG. 6 for example, the location 210 does not need to be marked with three different marks, it is simply marked with the most smallest shareable domain that it is within, that is inner. Thus, in this case any barrier marked as being inner or outer is considered to be within this domain and a barrier from the S0, S1 inner domain will be considered to be within its domain, even though it is not. Thus, no early response can be sent and the latency of the interconnect will increase which is the downside of this approach. However the marking of the domain is simpler as is the determination of whether a barrier is within the domain or not.

Figure 7:
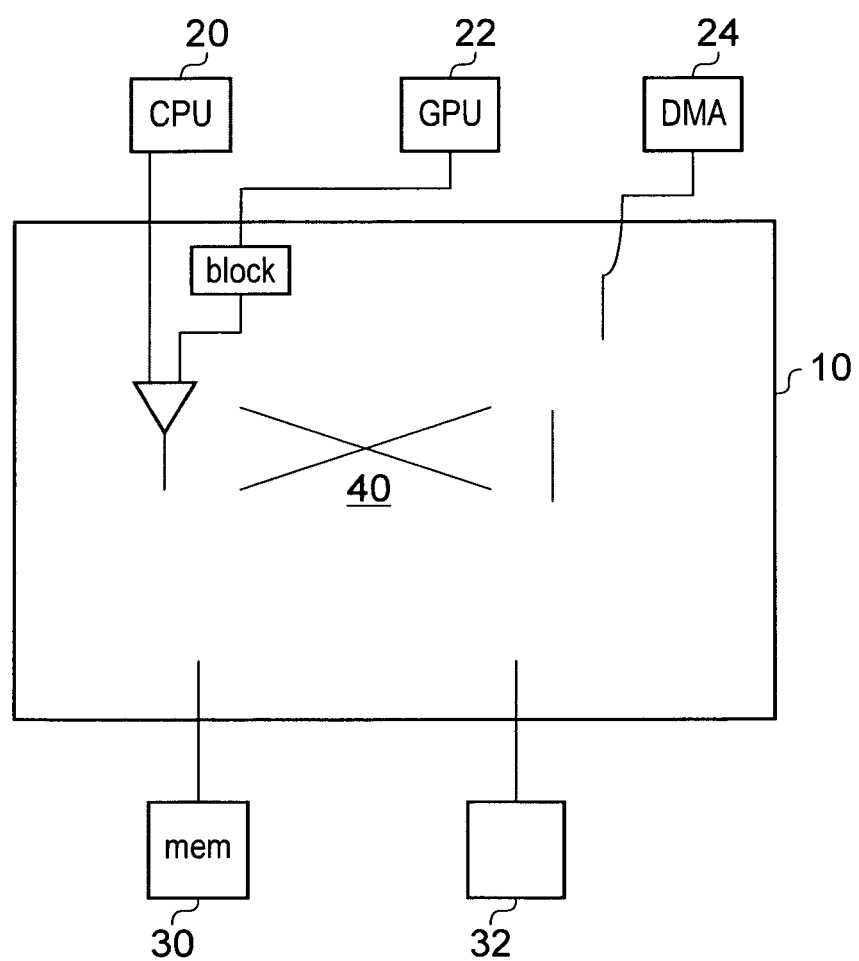
FIG. 7 shows a further interconnect according to an embodiment of the present invention.

FIG. 7 shows a further interconnect 10 having a plurality of masters 20, 22 and 24 and a plurality of slaves 30, 32. There is cross-coupled circuitry 40 not shown in detail between them.

This figure illustrates the use of the blocking indicator on the barrier transaction to indicate to the interconnect that the barrier has already been blocked upstream and the interconnect need take no further blocking action. Thus, in this case transactions issued by the GPU 22 are transactions for which latency is not important and thus, there is a blocking unit 90 that reacts to the barrier transactions issued and blocks the subsequent transactions to the barrier and marks the barrier transactions as being blocking barrier transactions. This means that no early response unit within interconnect 10 will early respond to this barrier transaction and all subsequent blocking units will not block in response to it. Thus, the barrier transaction stays as blocking until the barrier transaction itself reaches its final destination whereupon a response signal is sent to the GPU 22 and blocking circuitry 90 removes the block. It should be noted that although blocking circuitry 90 is shown within interconnect 10 it may be within the GPU 22 itself.

The advantage of being able to do this is that as noted previously where latency of transactions from a master are not important blocking these transactions close to the source means that the barrier transaction will not impose a latency penalty on the other masters by blocking transactions issued by them in the cross coupled region. It should be noted that if there are reconvergent paths in the interconnect, then blocking units within the interconnect may need to block in response to a barrier transaction to ensure correct ordering.

In embodiments that do not use this blocking indicator then all barriers inside their domain are considered to be blocking unless they are marked in some way as not being blocking.

Figure 8:
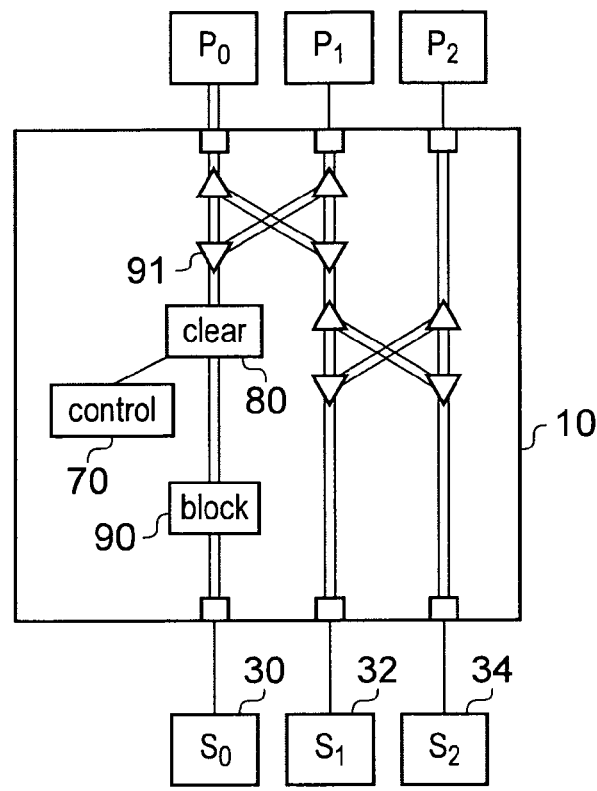
FIG. 8 shows an interconnect having parallel read and write paths according to an embodiment of the present invention.

FIG. 8 shows an interconnect 10 that is typical to ARM™ of Cambridge United Kingdom AXI™ busses. These busses have read and write channels in parallel and thus, they could be considered to have no bisection paths. However, transactions that travel along these paths are generally linked and provided one links a transaction along the other one of the paths to a barrier transaction that is sent, these paths can be treated as bisection paths and early responses and subsequent blocking can be used to reduce the latency of the barrier transaction. Thus, in this figure there is shown a path where an early response unit 80 generates an early response to a barrier transaction. It also provides a linked transaction to be sent down the other parallel path to the path the barrier transaction is travelling down. The subsequent blocking unit 90 will not send the barrier transaction further until the linked transaction is received. It should be noted that this behaviour of sending linked transactions and only responding when both have reached their destination is required where the barrier can merge, thus, at merge points such as 91 or within a slave. Thus, when sending blocking barrier transactions from blocking unit 90 to slave S0 a linked transaction needs to be sent and a response only sent when both the barrier transaction and its linked transaction have been received. The path that the blocking transaction is sent down is the only of the paths that is actually blocked.

It should be noted that were the read and write streams are to be merged, then the streams must be lined up at the merge point, thus, there must be some control mechanism to ensure that the barrier and linked transaction arrive at the merge point at the same time.

Figure 9:
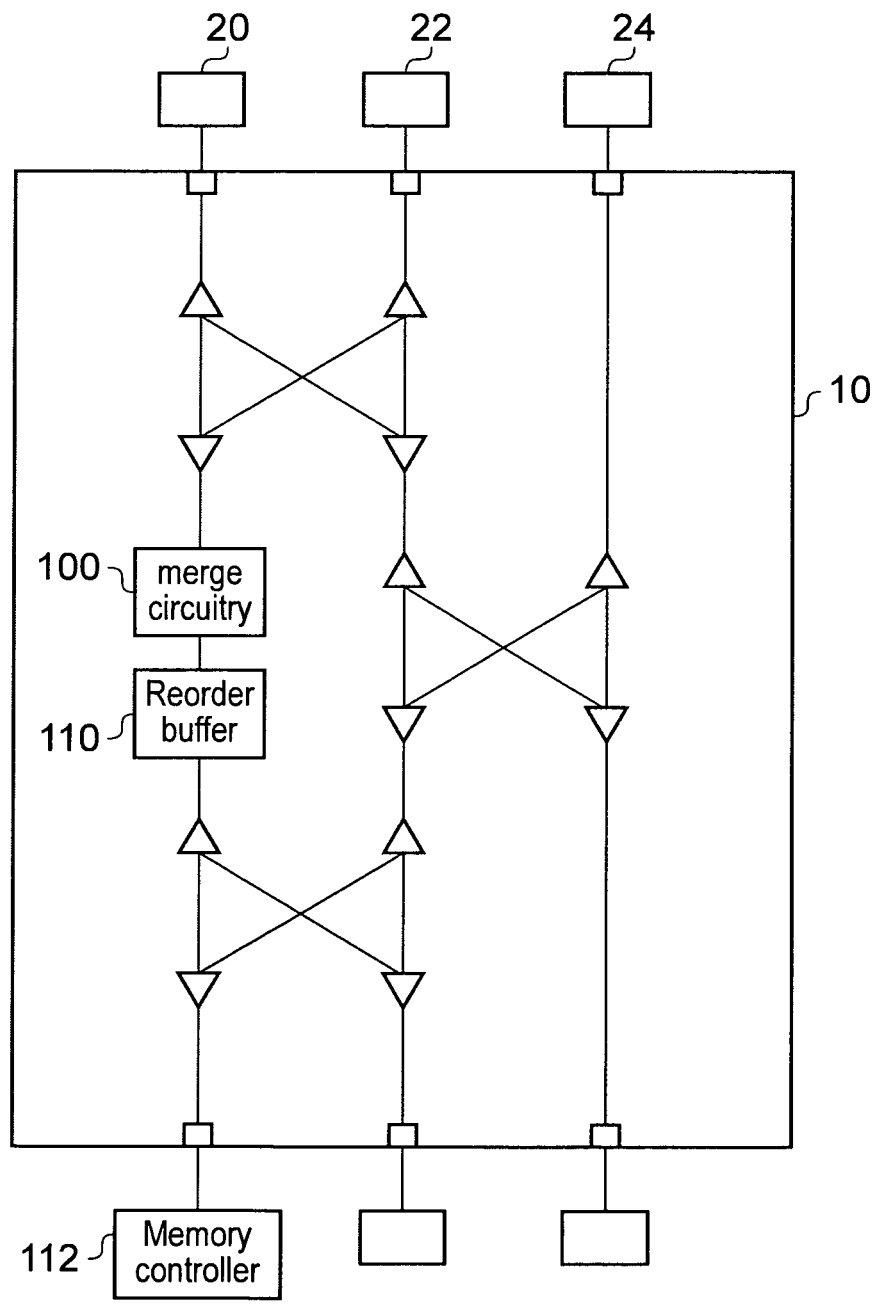
FIG. 9 shows an interconnect having a capacity to merge barrier transactions according to an embodiment of the present invention.

FIG. 9 shows an interconnect 10 according to an embodiment of the present invention that comprises a plurality of inputs to receive signals from masters 20, 22 and 24 and a plurality of outputs for sending the transaction request to a variety of slaves including memory controller 112.

The paths that the transactions are sent along include bisection paths and cross-coupled paths. The interconnect is configured to respond to barrier transaction requests to ensure ordering of transactions with respect to these barriers. There is merge circuitry 100 present that is used to increase the performance of the interconnect by merging barrier transactions where applicable. Thus, if it detects two barrier transactions adjacent to each other, it will merge them into a single barrier transaction and a response from that merged barrier transaction will cause response signals to be sent to both of the barrier transactions that have been merged.

It should be noted that if the barrier transactions have different properties then they may not be suitable for merging or they may need these properties amended so that the merged barrier transaction has a property that will enable both barrier transactions to function. Thus, for example, if the shareability domain of one of these barrier transactions indicates that it controls transactions from inner domain 1 and the adjacent barrier transaction from outer domain 1 which includes inner domain 1 and a further initiator devices, then the shareability domain of the merged barrier transaction will be outer domain 1. In other words, a shareability domain that encompasses both the shareability domains of the two barrier transactions that are merged will provide a merged barrier transaction that functions correctly. It should be noted, that if there are three or more adjacent barrier transactions then these too can be merged.

Merge circuitry 100 can also merge barrier transactions that are not adjacent but that only have intervening transactions that are not subject to the barriers. This can be done if the merge circuitry 100 is close to a re-order buffer 110. A re-order buffer is generally used to re-order transactions so that high priority transactions can be placed ahead of lower priority transactions and can exit to their particular slave ahead of the lower priority transactions. It can also be used in conjunction with merge circuitry 100 to re-order bather transactions that are not adjacent but that only have intervening transactions that barriers do not apply to. In this case the barrier transactions can be moved adjacent to each other and they can then be merged. It should be noted that this merge circuitry needs to be on a bi-section link otherwise, merging the barriers might cause some incorrect ordering due to duplicate barriers travelling down other paths.

Figure 10:
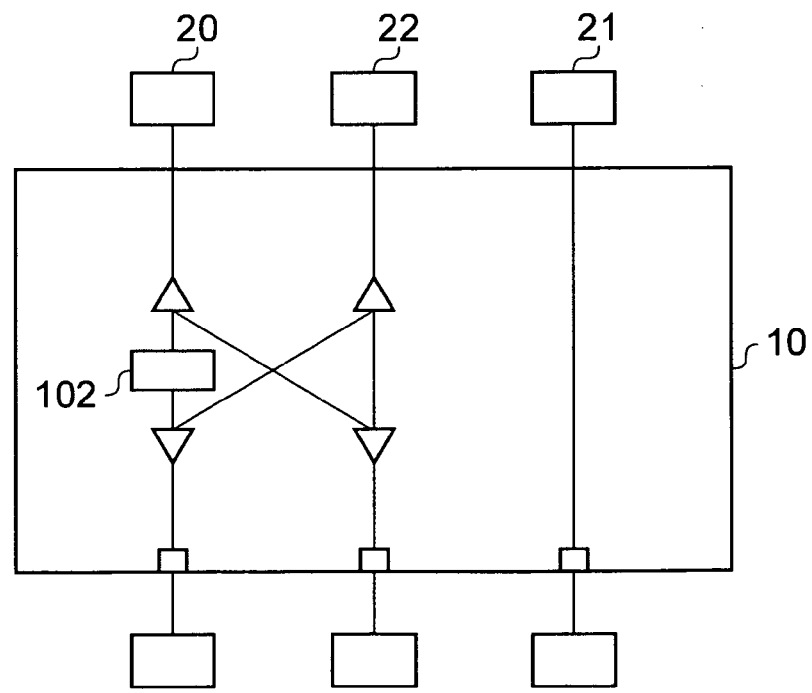
FIG. 10 shows an interconnect having a capacity to eliminate barrier transactions according to an embodiment of the present invention.

An alternative to merging barriers is eliminating them. FIG. 10 shows a similar circuit to FIG. 9 but with barrier elimination circuitry 102. It should be noted that in some embodiments the merge circuitry 100 and the elimination circuitry 102 are a single unit and act either to merge or eliminate barriers depending on circumstances. Barrier elimination circuitry 102 can be used on any path including cross-coupled and bisection paths and if it detects a barrier following another barrier which would apply to all non-barrier transactions that the following barrier would apply to and with no intervening non-barrier transactions to which the following barrier applies then this subsequent barrier may be stalled by the barrier elimination unit 102 until responses have been received for all such previous barriers. Once these responses have been received, these can be sent upstream and a response to the new barrier can also be sent upstream and this barrier can be eliminated. In this way, a barrier is removed from the interconnect circuitry and it increases performance.

Figure 11:
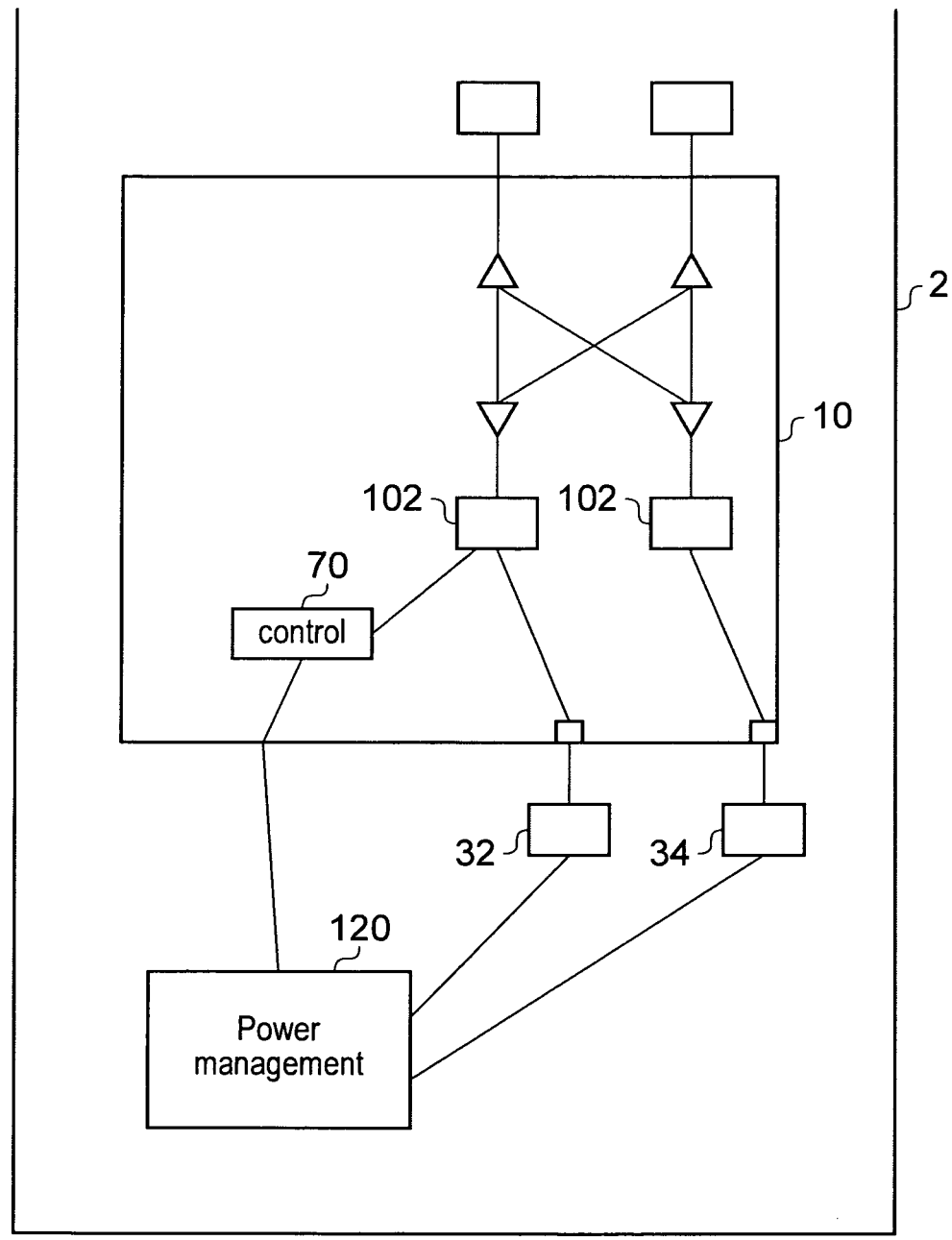
FIG. 11 shows a data processing apparatus having an interconnect according to an embodiment of the present invention.

This ability to perform in this way has an additional advantage that can be used when managing peripherals that are not used very often. FIG. 11 shows a data processing apparatus 2 having interconnect circuitry 10, power management unit 120 and several peripherals 32, 34 that enter inactive mode for long periods of time. Control circuitry 70 is used to control various portions of interconnect circuitry 10.

Transactions requests sent to peripherals 32 and 34 during their inactive periods may only be barrier transactions. These need to be responded to, but it would be disadvantageous if the peripheral is in a low power mode to wake it up simply to respond to a barrier transaction. In order to address this problem a barrier elimination unit 102 is used. A barrier elimination unit 102 placed on the paths to the peripherals enables a barrier to be generated by barrier elimination unit 102 in conjunction with control circuitry 70 and sent to the peripherals. Once the response has been received the peripherals can enter low power mode and then, on receipt of a further barrier transaction as a response has been received for a previous one, a response can simply be sent to the further barrier transaction without waking the peripherals and this barrier transaction can be eliminated.

The control circuitry 70 can trigger the barrier elimination unit to generate a barrier transaction in response to detecting inactivity of the peripherals and can then contact the power management circuitry to suggest that they enter low power mode once a response has been received. Alternatively, once a barrier transaction has been sent to the peripherals the control circuitry 70 could indicate this to the power management circuitry 120 which could then send a low power mode signal to the peripherals such that they enter low power mode. Alternatively, if the power management circuitry decides that it is time for the peripherals to enter low power mode it can signal this to the peripherals and to the control circuitry 70 at the same time. Entry to the low power mode can be delayed until a barrier transaction has been sent to the peripheral and a response received. At this point, the peripheral can enter low power mode and any subsequent barrier transactions can be responded to without the need to wake the peripheral.

Figure 12:
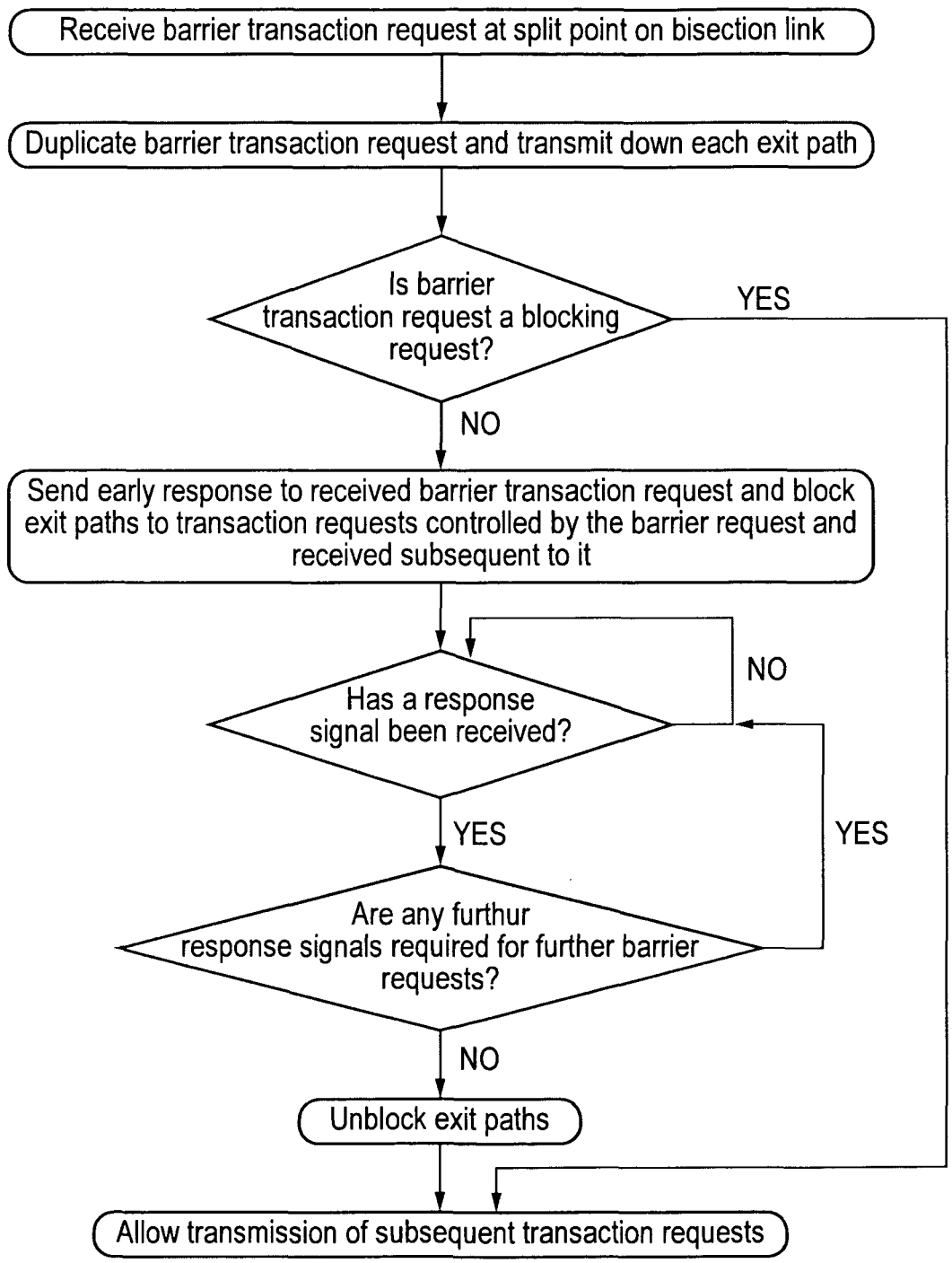
FIG. 12 shows a flow diagram illustrating steps in a method for moving a block due to a barrier transaction through an interconnect according to an embodiment of the present invention.

FIG. 12 shows a flow diagram illustrating a method of in effect moving a blocking barrier through an interconnect by sending an early response clearing signal and blocking further along the interconnect. In response to a barrier transaction request an early response signal is sent that a blockage upstream will receive and then clear so that subsequent transaction requests controlled by the boundary transaction request can be sent further. The circuitry then sends the barrier transaction request further itself but blocks the exit paths that it sends it along to subsequent transaction requests that are controlled by the barrier transaction request. If there are several paths it duplicates the barrier transaction request such that it is sent along each of the several paths. The circuitry then awaits response signals from each of the barrier transaction requests that have been sent further. When it receives these it can unblock the subsequent transaction request that has been blocked and these can be sent on. In this way, the latency of the interconnect is reduced as the blocking signal moves through it and the subsequent transaction requests are not held at the master until the barrier transaction request has completed at the slaves. It should be noted that for a data synchronisation barrier request no early response signal is permitted and these will cause the interconnect to be blocked to subsequent transaction requests that are controlled by the barrier until there is a clearing response from each of the peripherals that the barrier is sent to.

It should also be noted that if the barrier transaction request is a blocking request then no early response signals are sent in response to this transaction request either. A blocking request is one that is blocked upstream and is marked as such to indicate that the blockage should remain upstream. As there is a block upstream one can be sure that none of the transactions that it acts as a barrier to will be transmitted past the upstream block until a response signals is received to the barrier transaction request and thus, there is no need to block for this barrier transaction request.

It should be noted that there may be some points within the interconnect circuitry where an early response can be sent to a blocking request and the blockage moved downstream, with the reissued barrier itself being marked as either blocking or non-blocking. If it is non-blocking it is indicating that there may be transactions after it that need blocking, which is not the case as they will already have been blocked but this is OK, it is not OK to indicate that there are no transactions that need blocking if in fact some may exist. This may be useful, where a non-blocking barrier crosses a cross-coupled region and so subsequent transactions must be delayed, but you don't want it to block all the way to the exit points so you keep indicating it as non-blocking so that an early response is sent from the first location that is permitted to do so.

Thus, if the request is not a data synchronisation barrier transaction request or a blocking request, then an early response is sent and the exit paths that the duplicated barrier transaction requests have just been sent down are blocked to subsequent transaction requests that the barrier transaction request pertains to. In this way, the upstream paths are unblocked to subsequent requests and they can be sent as far as this new blockage which will reduce the latency of the system while still maintaining the required ordering. These subsequent requests will then be stalled at this point until this node is unblocked. It should be noted that in some cases the topology is such that giving an early response and blocking may actually be counterproductive, for example in cases where everything upstream is bisection there may be nothing that would benefit from unblocking and blocking at this point may be the first and unnecessary block.

To unblock the node the following steps are performed. It is determined if a response signal to any of the duplicated barrier transaction requests that have been sent further has been received. When one is received then it is determined if there are further response signals awaited for the further barrier requests. When all of the duplicated barrier requests have responded then the exit paths can be unblocked and the subsequent transaction requests can be transmitted further.

Figure 13:
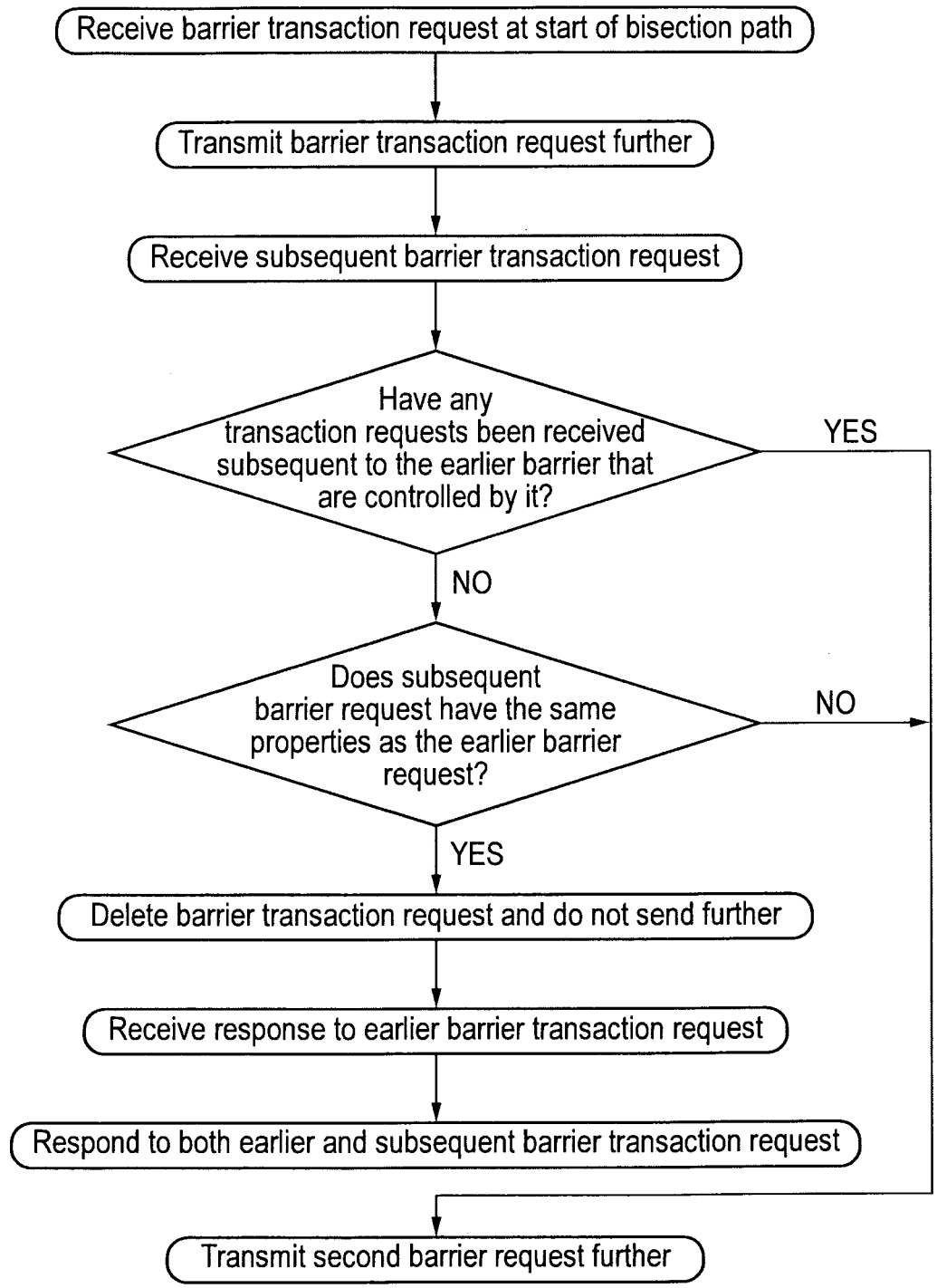
FIG. 13 shows a flow diagram illustrating steps in a method for eliminating a barrier transaction request according to an embodiment of the present invention.

FIG. 13 is a flow diagram illustrating steps in a method of eliminating barrier transaction requests.

A barrier transaction request is received at the start of a bisection path and is transmitted further along the bisection path.

A subsequent barrier transaction request is then received and it is determined if any transaction requests have been received subsequent to the original barrier request that are controlled by it. If there have been no such transactions then it is determined if the subsequent barrier transaction request has the same property as the earlier barrier transaction request. If it does then the subsequent barrier transaction request is deleted and not sent further and a response is sent to this barrier transaction request when a response is received from the earlier one. This is possible as the subsequent barrier transaction request has the same properties as the first one, the first one will act as a boundary to the transactions subsequent to the second one, and thus, there is no need to send the second one further. This reduces the amount of processing that needs to be performed by the control circuitry controlling these barrier transactions requests and can have additional advantages with peripherals in low power mode as becomes clear with respect to FIG. 14. It should also be noted that although not shown in this figure if the second barrier request is sent further then the interconnect operates in the normal way for two barrier requests.

If the subsequent barrier transaction request does not have the same properties as the earlier one then it needs to be sent further and responded to in the usual way. If the subsequent one affects a subset of transactions to the earlier one, for example it has a narrower shareability domain or affects writes only, as opposed to all functions then it can be responded to.

It should be noted that as this is on a bisection path, an early response could be sent to both barrier transaction requests when they are received and the second one could simply be deleted and the blockage required at the end of the bisection path need only be applied to the subsequent one.

It should also be noted that although this flow diagram is shown with respect to a bisection path, elimination of a subsequent barrier transaction when the barriers have the same properties and there are no intervening transactions subject to the barriers can be done on any path provided a response is sent to both barriers when it is received for the first one.

Figure 14:
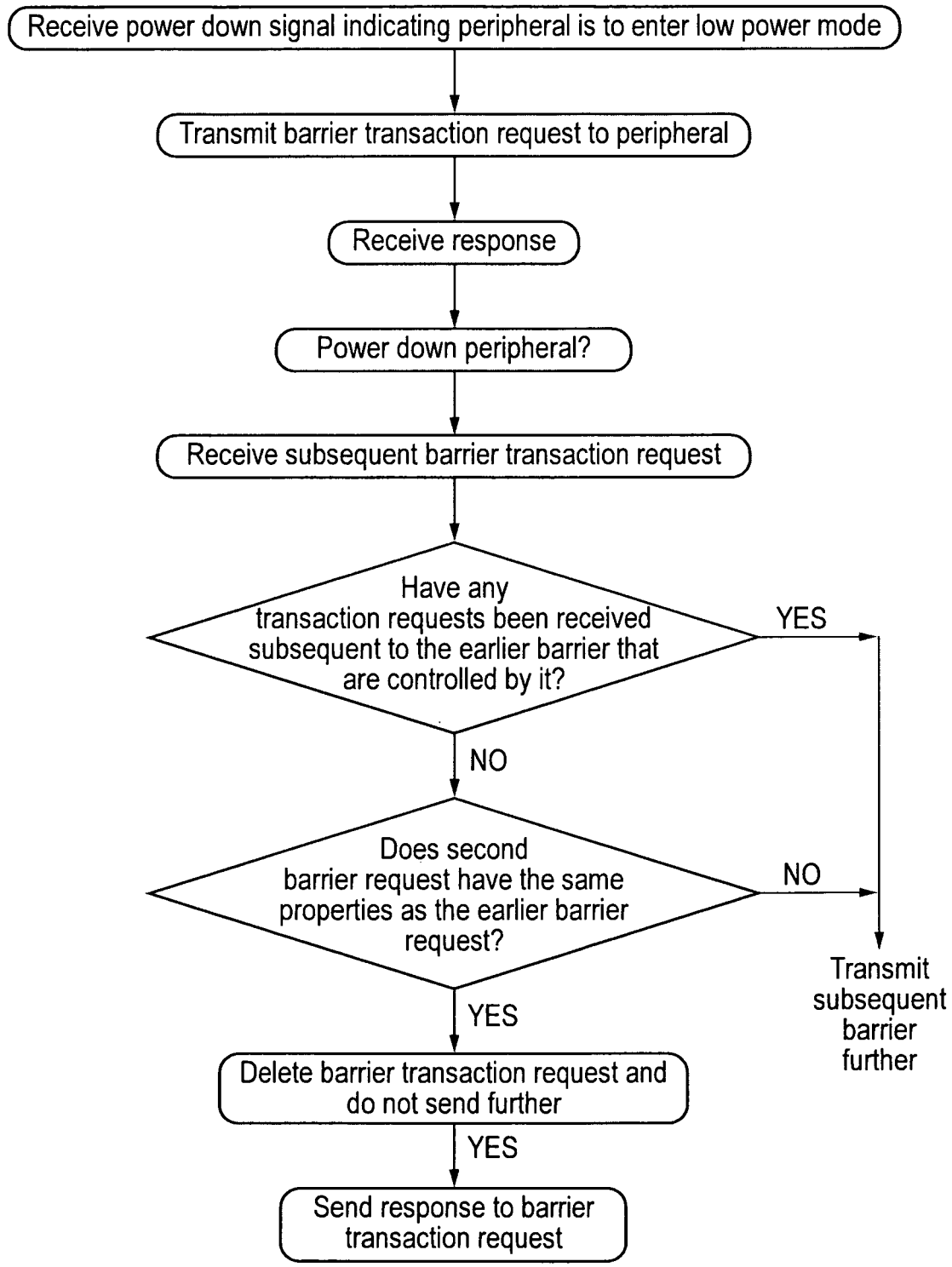
FIG. 14 shows a flow diagram illustrating steps in a method for controlling peripherals to enter a low power mode according to an embodiment of the present invention.

FIG. 14 shows a flow diagram illustrating the steps in a method for controlling peripherals to enter low power mode taking advantage of the properties of barrier boundary elimination described with respect to FIG. 13. A power down signal is received indicating a peripheral is to enter a low power mode. In response to receipt of this signal, a barrier transaction request is submitted along a bisection path to the peripheral and a response is received. The peripheral is then powered down. On receipt of a subsequent barrier transaction request it is determined if any transaction requests have been received subsequent to the earlier barrier that were controlled by it. If none have been received then this later barrier transaction request, if it has the same properties as the earlier barrier transaction request, can be deleted and not sent further and a response to it can be sent. In this way, if the peripheral is in a state of inactivity then it need not be disturbed and woken up by a barrier transaction request.

Figure 15:
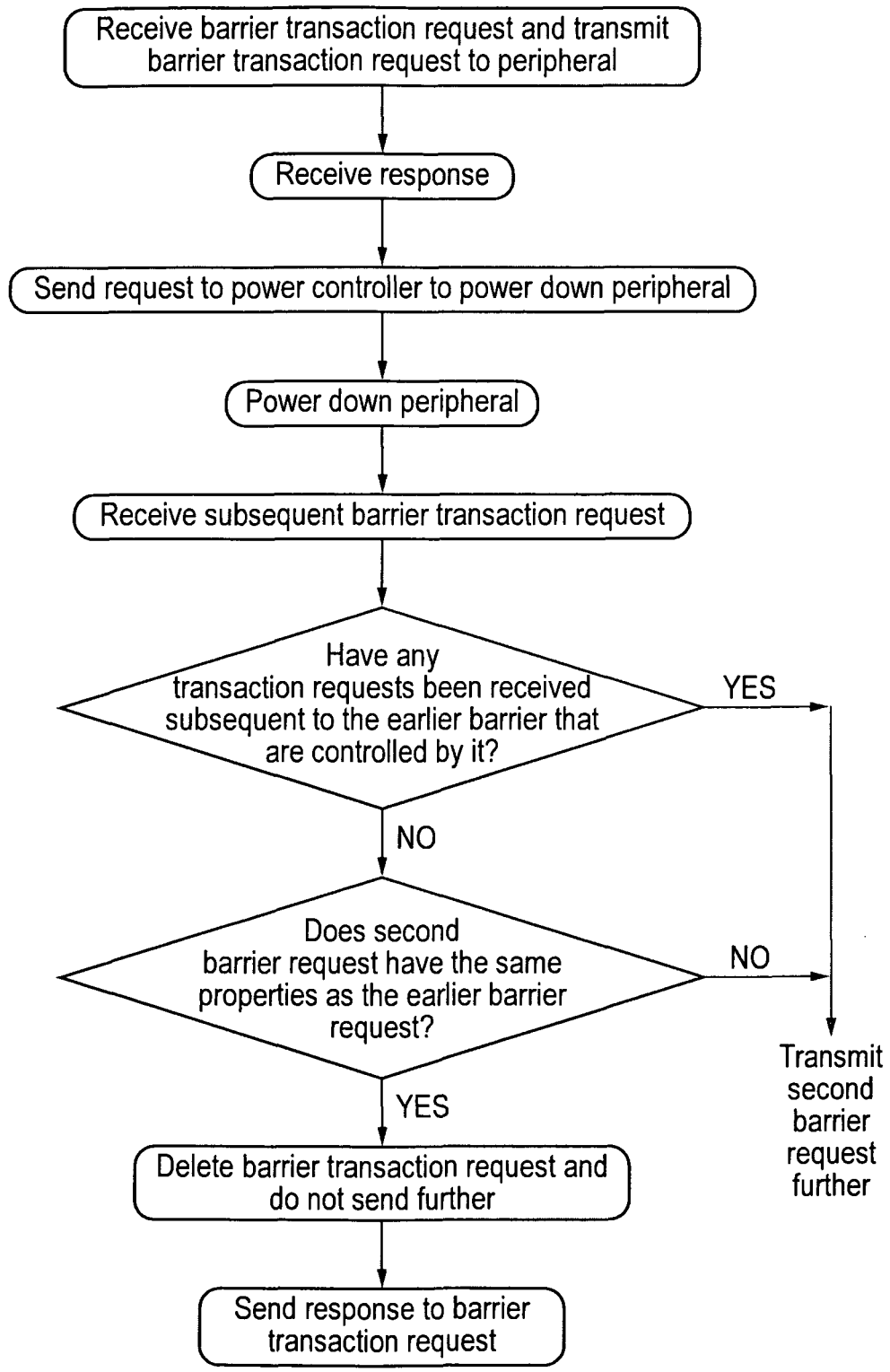
FIG. 15 shows a flow diagram illustrating steps in a method to reduce the power consumption of a peripheral according to an embodiment of the present invention.

If there are intermediate transactions controlled by the earlier barrier or if the second barrier does not have the same properties as the earlier bather then the barrier cannot be deleted but must be transmitted further in the usual way FIG. 15 shows a flow diagram illustrating steps in a method to reduce the power consumption of a peripheral. A barrier transaction request is received and transmitted to the peripheral and a response is received in reply to it. In response to receiving this bather transaction request it is recognised that subsequent barrier transaction requests can now be eliminated and thus, it may be a convenient moment for the peripheral to enter low power mode. Thus, a request is sent to the power controller to power down the peripheral and the peripheral is powered down. Now subsequent bather transactions that are received, provided no intermediate transaction request controlled by the earlier boundary request have been received and provided they have the same properties, can be deleted and a response to them sent without the need to disturb the sleeping peripheral.

If intermediate transactions controlled by the earlier barrier have been received or if the second barrier does not have the same properties as the earlier barrier then the barrier cannot be deleted but must be transmitted further in the usual way.

Figure 16:
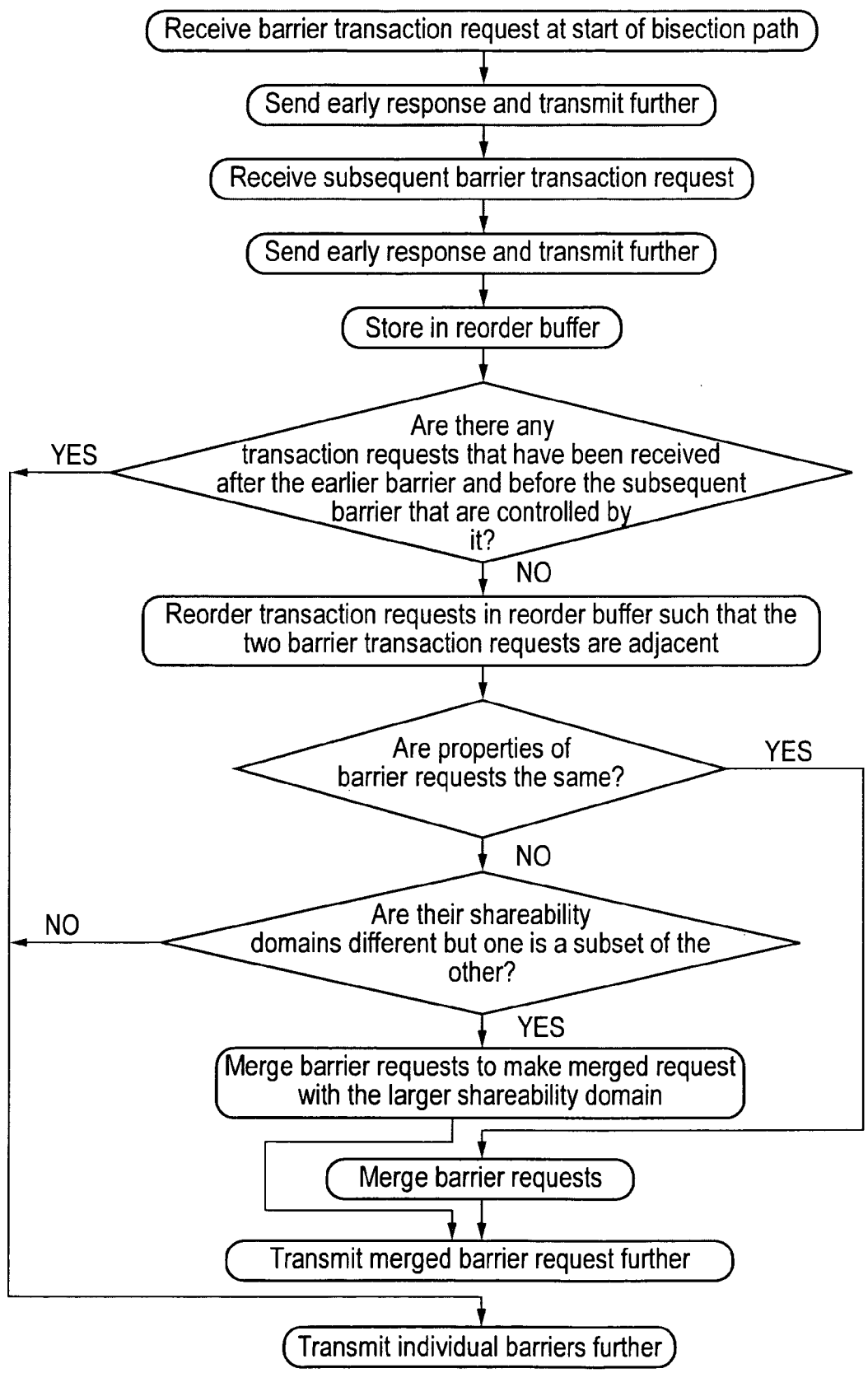
FIG. 16 shows a flow diagram illustrating steps in a method to reduce the overheads associated with barrier transactions by merging them where possible according to an embodiment of the present invention.

FIG. 16 shows steps in a method of reducing the overheads associated with barrier transaction requests by merging them where possible.

Thus, a bather transaction request is received at the start of a bisection path and an early response is sent and the barrier transaction request is transmitted further. As it is the start of a bisection path there is no need at this point to block the path for subsequent transaction requests.

A subsequent bather transaction request is then received an early response is sent and the barrier is sent further. There is a reorder buffer on the bisection path and both barriers are stored in this. It is then determined if any transaction requests have been received subsequent to the earlier bather that were controlled by it and were received before the subsequent bather. If there aren't any the two barrier transaction requests are moved to be adjacent to each other at the position of the subsequent one. If there were no intervening transactions that the subsequent barrier would control then it could be moved adjacent to the earlier one. It is then determined if the properties of the barrier requests are the same. If they are then they can be merged and a single barrier request sent further at the correct point in the stream. If they do not have the same properties then it is determined if the properties are the same except for the shareability domains and it is also determined if one of the shareability domains is a subset of the other. If this is the case then the barrier requests can be merged and the merged request given the larger of the two shareability domains. The merged barrier requests are then sent further. If the properties of the barrier requests are such that they cannot be merged then the separate requests are sent further.

It should be noted that although merging of barriers is described above with respect to a reorder buffer, adjacent barrier transactions with suitable properties can be merged on a bisection path, without the need for a reorder buffer.

It should also be noted that in a reorder buffer if there are transactions that could be reordered except for a barrier instruction between them that inhibits this reordering, then in some embodiments it is permissible to merge the transactions and to generate two barriers one on either side of the resulting merged transactions.

Figure 17:
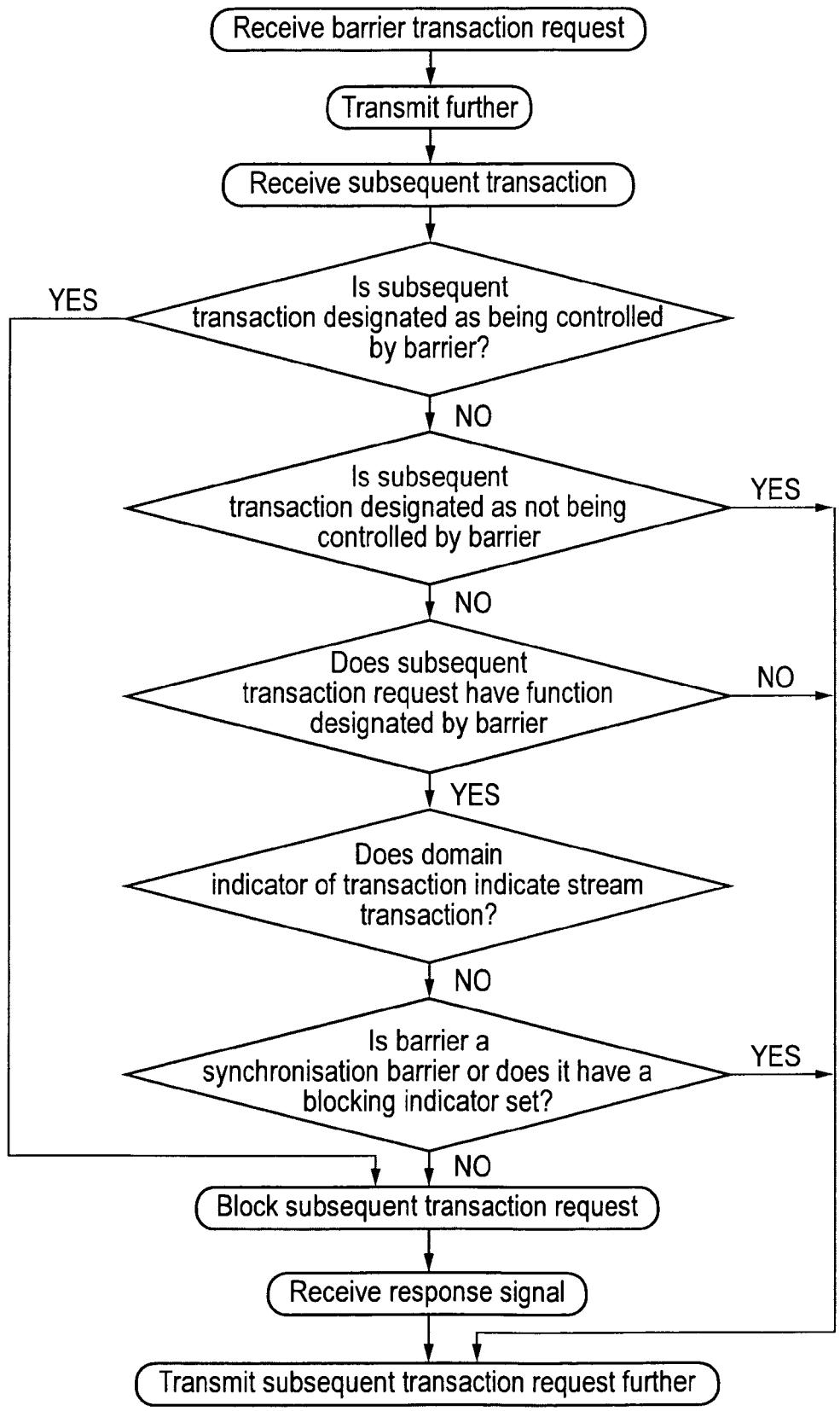
FIG. 17 shows a flow diagram illustrating steps in a method of processing barrier transactions at a blocking unit within an interconnect according to an embodiment of the present invention.

FIG. 17 is a flow diagram showing steps in a method of processing barriers at a blocking unit within the interconnect such as that shown in FIG. 1 that illustrates the different properties a barrier transaction can have.

Thus, following receipt of a barrier transaction if a subsequent transaction is designated as being controlled by that barrier then it is blocked until a response is received. If it is not so designated, then the other properties of the transaction are considered. If it is designated as not being controlled by the barrier, then it is transmitted further and not blocked. If it isn't it is determined if it has a function designated by the barrier. It should be noted the barrier may not designate a particular function, in which case the transactions are blocked irrespective of their function, however, if it does specify a function then transactions not performing this function are not blocked and are transmitted further. If the subsequent transaction indicates a domain, then it is determined if the domain indicator of the transaction is a stream indicator, if it is then the transaction is not blocked but if it is any other domain it is blocked. It is also determined if the barrier is a synchronisation barrier or if it has a blocking indicator. In either case the subsequent transactions will not be blocked by these barriers as subsequent transactions will have been blocked previously and thus, any subsequent transactions received will not be affected by these barriers.

It should be noted that although the steps are shown in a particular order, they can of course be performed in any order. Furthermore, where the barrier has no indicator of a particular function, initiator or domain, then these things do not need to be considered.

Figure 18:
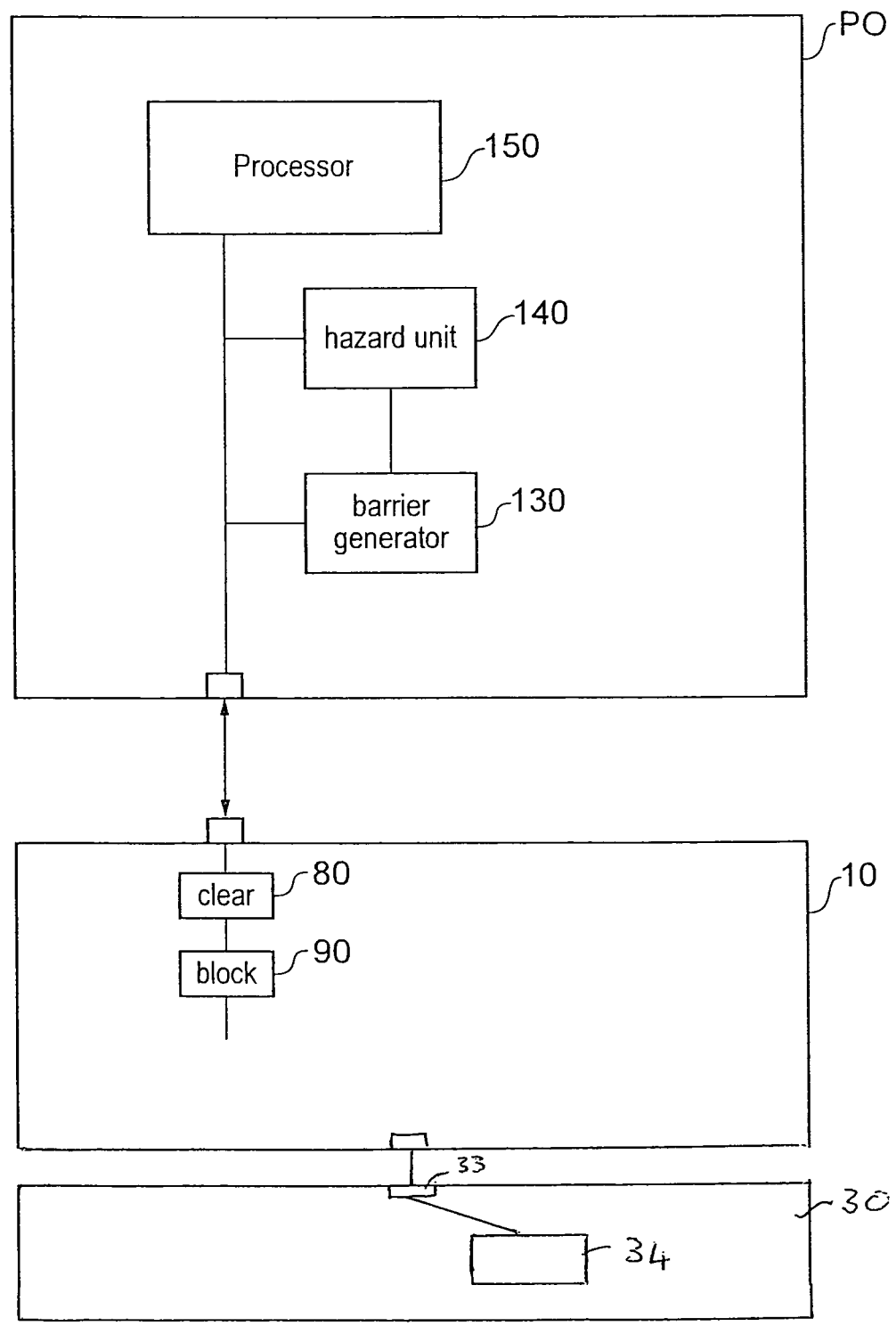
FIG. 18 shows an initiator device and a recipient device according to the present technique.

FIG. 18 shows an initiator device and a recipient device according to the present technique. This initiator device is a processor P0 which is connected to an interconnect 10 and then to recipient device 30. Interconnect 10 may have more recipient devices and initiator devices not shown connected to it In this embodiment it is the initiator device, P0 that generates the barriers using barrier generator 130. This barrier generator generates barrier transaction requests with at least one indicator. This indicator may be an indicator indicating the nature of the barrier transaction request, that is which transaction requests it controls or it may be an indicator indicating whether the transaction request is blocking or not or it may be both. If the indicator indicates that the barrier transaction request is a blocking request then initiator device P0 does not issue any further transaction requests subsequent to the barrier transaction request to the interconnect until a response signal to that barrier has been received.

Initiator device P0 also has a processor 150 and a hazard unit 140.

Memory hazards arise when transactions to the same address which have been issued by an agent, in the expectation that they will occur in a particular order, could be reordered with respect to each other. When they detect a hazard, masters must not issue the later transaction until it has seen completion (for a read) or buffered response (for a write) for the earlier transaction.

To permit the determination of a hazard, a master must have a transaction tracking mechanism that records transactions against which a hazard could occur. This is provided in the form of hazard unit 140, which stores the pending transactions against which a hazard could occur, until they are no longer hazards. Hazard unit 140 has a finite size that is advantageously quite small, thus, there is a risk that the hazard unit might become full. If this occurs then processor 150 needs to stall issuing transactions until one of the transactions stored in the hazard unit has completed and can be deleted from the hazard unit. If pending transactions that should be stored in the hazard unit are not stored then a hazard can occur which cannot be corrected. This is not allowed. Clearly stalling in this way is costly in increased latency.

Hazards are removed when the transaction has completed without the hazard occurring. However, if a hazard were to be protected against by issuing a barrier, the earlier transaction may be removed from the hazard unit 150 as it is no longer vulnerable to any subsequent hazarding transaction. Thus, embodiments of the present invention address this latency problem by using barrier generator 130. Barrier generator 130 can detect when hazard unit 140 is full and in response to detecting this can issue a barrier transaction. This barrier transaction will stop subsequent transactions from being re-ordered with respect to it and thus, can remove potential hazards of the transactions stored in the hazard unit which can then be evicted from the hazard unit. Thus, if the barrier generator generates a global barrier which no transactions can be re-ordered with respect to, then hazard until 140 can be flushed. However, a global barrier will itself generate latency in the interconnect and may not be desirable.

Thus, in some embodiments it may be more advantageous to generate an addressed barrier that corresponds to an address of a transaction within the hazard unit. Generally the most recent transaction in the hazard unit is selected as it is likely that this will be the last one to be evicted during normal operation. Thus, the bather generator 130 detects the address of the most recent transaction in the hazard unit and issues a barrier related to this address such that any transactions to that address are not allowed to be re-ordered with respect to that barrier. This ensures that this addressed transaction is no longer a possible hazard and it can be evicted from the hazard unit. This frees up a space and allows processor 150 to continue issuing transactions.

Barrier generator 130 can also be used to generate barriers in other circumstances. For example, it may detect strongly ordered transactions that are issued by the processor which must be completed in a certain order. Generally when a strongly ordered transaction is output, P0 does not output any further transactions until it has a response signal from the strongly ordered transaction indicating that it has completed. This of course affects the latency of processor P0. In some embodiments, barrier generator 130 detects the processor 150 issuing a strongly ordered transaction and itself issues a barrier. Once the barrier has been output to the interconnect 10 response unit 80 within the interconnect sends a response signal to the processor P0 which clears the barrier and allows processor P0 to output further transactions. In order to avoid problems due to re-ordering with respect to the strongly ordered transaction blocking unit 90 blocks subsequent transactions. Interconnect 10 deals with the barrier as it passes through the interconnect, blocking and clearing as appropriate and processor P0 can continue to issue transactions. As the interconnect is designed to deal with barriers to reduce latency where possible, the latency of the system can be reduced as compared to a block occurring at processor P0 until the strongly ordered transaction has completed.

Recipient device has a port 33 for receiving transaction requests from the initiator device P0 via interconnect 10 and in response to receipt of a blocking barrier transaction request, response signal generator 34 issues a response and transmits it to interconnect 10 via port 33. In response to the barrier transaction request being a non-blocking transaction request, recipient device 30 may not issue any response. Furthermore, the recipient device may be responsive to some indicators on the barrier transaction request to delay generating and/or transmitting said response signal until processing of previously received transaction requests has at least partially completed. It may be that certain barrier transaction requests require not only that the earlier transaction requests have reached their final destination but also that they have completed processing, this is the case for example with a data synchronisation barrier. Thus, in response to the recipient device recognising such a barrier perhaps from indicator values within the barrier transaction request, the recipient device may delay the transmission of the response signal until the require processing has completed.

Figure 19:
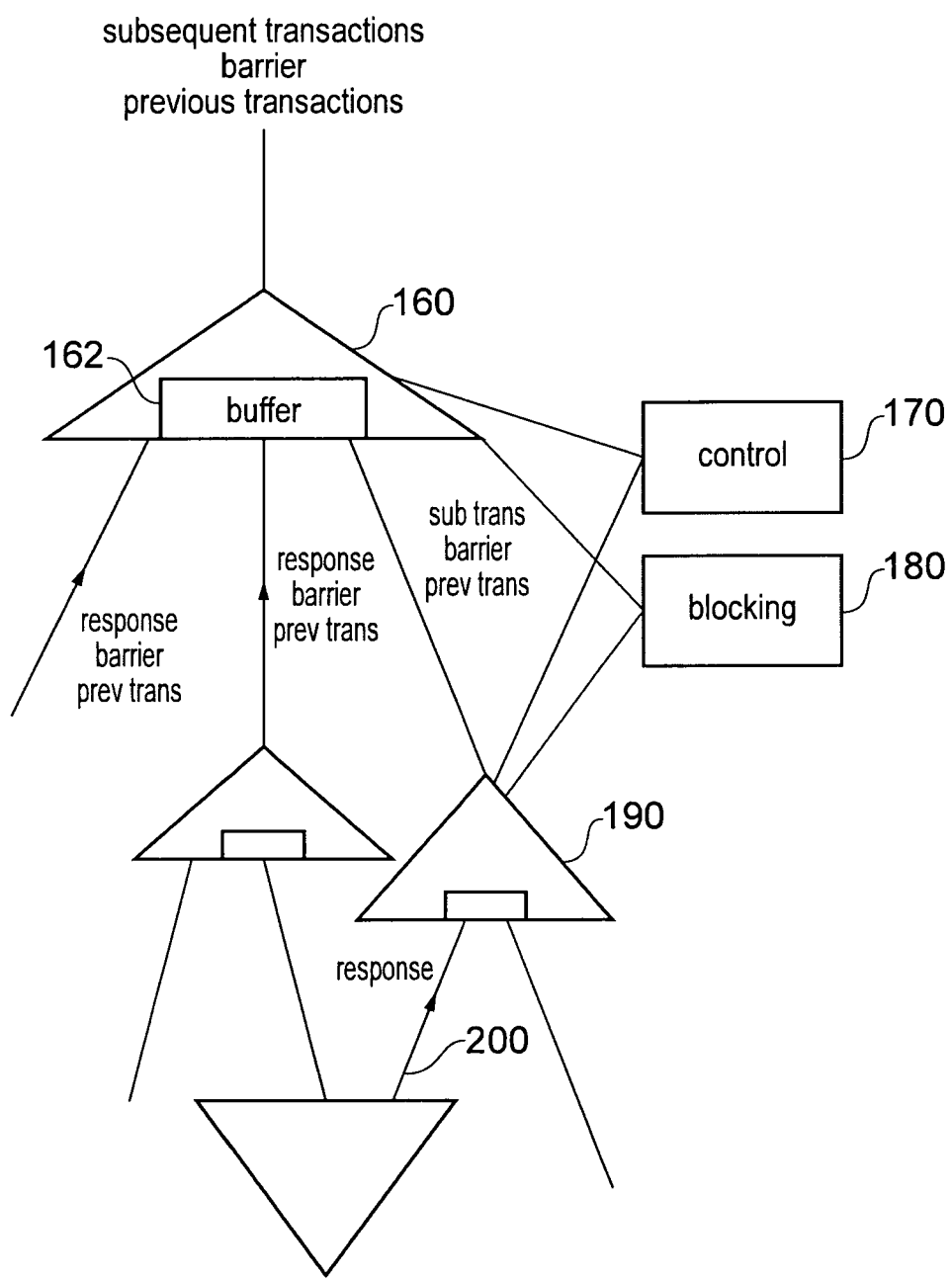
FIG. 19, schematically shows transmission and blocking of transactions.

FIG. 19 shows diagrammatically blocking and responding to transactions in a cross coupled, reconvergent region. A transaction stream having a barrier within it arrives at divergent point 160. Divergent point 160 has control circuitry 170 and barrier management circuitry 180 associated with it. It also has buffer 162 for storing transactions.

Barrier management circuitry 180 duplicates the barrier and sends the duplicated barriers down each of the exit paths. Control circuitry 170 acts to block the subsequent transactions from progressing further and monitors for response signals to the duplicated barrier transactions. In response to receiving two responses, the control circuitry in this embodiment unblocks the path that no response has yet been received on and allows the subsequent transactions to proceed down this path. As they are only allowed down this one path they cannot overtake the barrier and the previous transactions on this path, and the barriers on the other paths have been responded to, so there is no danger of reordering with respect to those transactions. Unblocking this path early is particularly advantageous as this may well be the path with the most traffic, as it is the slowest to respond and thus, sending subsequent transactions as soon as possible down this path helps reduce latency.

Before sending the subsequent transactions, a barrier representation may also be sent down this path. This is required where there may be further splitting of the paths as in this case.

At the next point of divergence 190, receipt of the barrier results in a response signal being sent and the other paths being cleared, while receipt of the barrier representation results in the barrier management circuitry 180 duplicating the barrier and sending it down each of the exit paths while the control circuitry 170 acts to stall the subsequent transactions. In response to receipt of a response signal on one of the paths the other path can be unblocked as the only path no response has been received on and subsequent transactions sent further along with a barrier representation. When a response has been received on both paths then both paths are unblocked.

It should be noted that the barrier representation is never duplicated and does not require a response. It just allows the control circuitry to understand that the transactions subsequent to it were transmitted prior to a response being received and thus, if there is a subsequent point of divergence for example, blocking may be required.

This is a convenient way of improving the efficiency of dealing with barriers. Furthermore, in some examples it may be particularly advantageous if, path 200 shown in FIG. 19 happened to be a path with little traffic where perhaps the previous transaction was a barrier for which a response has been received, then on this duplication of the barriers at the point of divergence 190 barrier management circuitry will be aware that the previous transaction down path 200 was a barrier and that a response signal has been received for it and it can delete the duplicated barrier and respond and in this case, it can immediately open the other path and send the subsequent transactions to it, thereby reducing the latency of the system still further.

FIG. 20 shows a summary of the different sorts of barrier transactions and how they can be converted from one type to another as they enter different regions of the interconnect that have different requirements. In this way the latency introduced by a barrier can be reduced by removing its blocking nature where possible and reintroducing it as required.

The memory barrier transactions can be blocking or not depending on where they are in the interconnect. In effect there are three different behaviours of these barriers, and these can be thought of as three different types of memory barrier. There is an order barrier which does not block but stays in the transaction stream separating the subsequent transactions from the earlier ones, in an interconnect having domains a memory barrier outside of its domain acts as an order barrier, a system flush barrier which does block deliberately and corresponds to a DSB, and a local flush barrier which generally does not block but will do so locally for necessary topological reasons (in a cross coupled region) or optional performance reasons.

Conversion between these types is possible in many cases. Conversion from an order barrier to a system or local flush barrier requires that the conversion point block subsequent transactions. Conversion from a system or local flush barrier to an order barrier does not require that an early response is given (to cause subsequent transactions to be sent), but one may be provided—such conversion without sending an early response is pointless as it would not reduce the latency for the barrier issuer and would cause more masters to be blocked at the next cross coupled region. If an early response is required (and permitted—i.e. in a bisection region) then if it is in response to a system or local flush barrier then as the early response could cause transactions from behind the barrier to be sent, either the location providing the response must block these later transactions or it must change the barrier so that it is an order barrier.

In general it is anticipated that optional conversion will be infrequent as the nature of the transaction is useful to honour for performance management and Quality of Service reasons—the blocking nature of the barrier at issue can be used to trade-off the latency that the barrier's blocking nature adds to the issuer and to other masters.

FIG. 20 shows the permitted blocking conversions according to the context they occur in and what blocking is required for the conversions.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Interconnect circuitry for a data processing apparatus, said interconnect circuitry configured to provide data routes via which at least one initiator device may access at least one recipient device, said interconnect circuitry comprising:
   at least one input for receiving transaction requests from said at least one initiator device;
   at least one output for outputting transaction requests to said at least one recipient device;
   at least one path for transmitting said transaction requests between said at least one input and said at least one output;
   control circuitry configured to route said received transaction requests from said at least one input to said at least one output; wherein
   said control circuitry is configured to respond to a barrier transaction request to maintain an ordering of at least some transaction requests with respect to said barrier transaction request within a stream of transaction requests passing along one of said at least one paths, by not allowing reordering of at least some of said transactions requests that occur before said barrier transaction request in said stream of transaction requests with respect to at least some of said transaction requests that occur after said barrier transaction request in said stream of transaction requests; wherein
   said control circuitry comprises a response signal generator, said response signal generator is configured to issue a response signal upon receipt of at least some of said barrier transaction requests, said response signal indicating to upstream blocking circuitry that any transaction requests delayed in response to said barrier transaction request can be transmitted further.

2. Interconnect circuitry according to claim 1, wherein said control circuitry further comprises blocking circuitry configured to respond to at least some of said barrier transaction requests to maintain said ordering by delaying transmission of said at least some transaction requests that occur subsequent to said barrier transaction request in said stream of transaction requests until receipt of said response signal clearing said barrier transaction.

3. Interconnect circuitry according to claim 1, said blocking circuitry being responsive to receipt of said barrier transaction to block an exit path that said barrier transaction is transmitted along, to said at least some transaction requests subsequent to said barrier transaction until receipt of a response signal.

4. Interconnect circuitry according to claim 2, wherein said response signal generator is located immediately upstream of said blocking circuitry.

5. Interconnect circuitry according to claim 1, wherein said response signal generator is located at a point of serialisation within said interconnect, beyond which point transaction requests passing through that point of serialisation and to the same address cannot be reordered, said response signal generator being configured to generate said response signal to said barrier transaction request and not to transmit said barrier transaction request further.

6. Interconnect circuitry according to claim 1, said interconnect comprising a plurality of paths for transmitting said transaction requests between said at least one input and said at least one output, wherein at least some of said plurality of paths are divergent paths diverging from a node, said control circuitry being configured to duplicate and transmit said barrier transaction request along at least some of said divergent paths that said at least some transaction requests are routed along.

7. Interconnect circuitry according to claim 6, said control circuitry comprising said response signal generator and blocking circuitry arranged at said point of divergence, said response signal generator sending a response to said received barrier transaction and said blocking circuitry being configured to delay transmission of said at least some transactions subsequent to said barrier transaction along said at least some of said divergent paths until after receipt of response signals responding to at least all but one of said duplicated barrier transactions.

8. Interconnect circuitry according to claim 7, said control circuitry being configured to transmit said at least some transactions subsequent to said barrier transaction further in response to receipt of response signals responding to all of said duplicated barrier transactions.

9. Interconnect according to claim 7, wherein in response to receipt of all but one of said response signals, said control circuitry is configured to transmit said at least some transactions routed along said one divergent path that no response has been received on further.

10. Interconnect according to claim 9, wherein prior to sending said at least some transactions routed along said one divergent path further, a representation of said barrier transaction is sent along said one divergent path.

11. Interconnect according to claim 10, wherein said control circuitry is responsive to receipt of said representation of said barrier transaction at a further point of divergence to transmit a barrier transaction along all of said divergent paths and to delay further transmission of said transactions subsequent to said representation of said barrier transaction along said divergent paths until a response to said barrier transaction has been received from all but one of said divergent paths and to transmit said representation of said barrier transaction along said one divergent path and allow subsequent transactions to be transmitted along said one divergent path.

12. Interconnect circuitry according to claim 6, wherein said plurality of paths comprise at least one bisection path that comprises an only communication path between two nodes within said interconnect circuitry, said two nodes comprising an entry node and an exit node to said bisection path;
said response signal generator being located at said entry node and being responsive to receipt of said barrier transaction request to transmit said response signal along said entry path that said barrier transaction request was received from; and
blocking circuitry being located at said exit node and being responsive to receipt of said barrier transaction request to delay transmission of said at least some transaction requests subsequent to said barrier transaction requests along all paths that said barrier transaction request is transmitted along until receipt of response signals from all of said barrier transaction requests.

13. Interconnect circuitry according to claim 1, wherein said interconnect comprises a plurality of paths for transmitting said transaction requests between said at least one input and said at least one output, said plurality of paths comprising at least two paths running in parallel between said entry node and said exit node said at least two paths being configured to carry related transactions, said control circuitry comprising:
said response signal generator at said entry node for generating said response signal for transmission along said entry path said barrier transaction request is received on; and
blocking circuitry located at said exit port, said blocking circuitry being responsive to receipt of said barrier transaction request from one of said at least two paths to delay transmission of said at least some transactions subsequent to said barrier transaction received from said one of said at least two paths along said exit paths and in response to receipt of said transaction related to said barrier transaction from another of said at least two paths to transmit said barrier transaction along said exit paths.

14. Interconnect circuitry according to claim 13, wherein said plurality of paths comprise a path for transmitting read signals and a path for transmitting write signals.

15. Interconnect circuitry according to claim 13, wherein said response signal generator is responsive to receiving a barrier transaction request relevant to only a read or a write to modify said barrier transaction request to apply to both a read and a write before transmitting said barrier transaction request further.

16. Interconnect circuitry according to claim 1, said interconnect circuitry comprising at least one domain, said at least one domain comprising at least one of said at least one inputs for receiving transaction requests from said at least one initiator device, a domain boundary being arranged such that any merging of transaction requests received from said at least one input occurs within said at least one domain; and
said barrier transaction request comprises an indicator indicating whether it applies to said at least one domain; and
said control circuitry is responsive to detecting said barrier transaction request comprising said indicator indicating it applies to said at least one domain, being outside of said at least one domain to provide an indication indicating that said barrier transaction is outside of said domain.

17. Interconnect circuitry according to claim 16, wherein said indication comprises an indicator applied to said barrier transaction request indicating that it is now outside of said domain to which it applies.

18. Interconnect circuitry according to claim 16, wherein said indication comprises a response signal issued along an entry path that said barrier transaction request was received on by said response signal generator.

19. Interconnect circuitry according to claim 16, said interconnect circuitry comprising a plurality of domains, each of said plurality of domains comprising at least one of said at least one inputs for receiving transaction requests from said at least one initiator device, domain boundaries being arranged such that any merging of transaction requests received from said at least one inputs within one of said domains occur within said one of said domains.

20. Interconnect circuitry according to claim 19, wherein at least one of said plurality of domains is a subset of a larger domain and there is a hierarchy of domains for each input, such that if an input is a member of a domain of a lower hierarchy it is also a member of a domain of a higher hierarchy, and a transaction exits said domain of said lower hierarchy at a same time as or before it exits said domain of said higher hierarchy.

21. Interconnect circuitry according to claim 20, wherein said domains comprise a non-shareable domain containing only one of said inputs and a system domain comprising all of said inputs, and at least one further type of shareable domain, for each input there is a domain hierarchy such that an input within a non-shareable domain is also within said at least one type of shareable domain for said input, an input within said at least one type of shareable domain is also within said system domain for said input.

22. Interconnect circuitry according to claim 20, wherein said domains are arranged such that no domain boundary crosses another domain boundary and exit paths from each domain comprise bisection paths, said control circuitry being configured on detecting said barrier transaction request exiting one of said domains to modify said domain indicator such that said domain indicator indicates a domain of a lower hierarchy, said domain indicator indicating a domain of a lowest hierarchy indicating that said barrier has exited said indicated domain.

23. Interconnect circuitry according to claim 20, said interconnect comprising at least one component configured to provide domain dependent behaviour, said interconnect circuitry being configured to mark said at least one component with a mark indicative of at least one domain said at least one component is located within, such that said domain dependent behaviour is determined dependent upon said at least one domain indicated by said mark.

24. Interconnect circuitry according to claim 23, wherein when said at least one component configured to provide domain dependent behaviour is located within at least two domains, said interconnect circuitry is configured to mark said at least one component such that said domain dependent behaviour is determined dependent upon said domain providing a most restrictive barrier behaviour that said at least one component is within.

25. Interconnect circuitry according to claim 23, wherein said at least one component comprises said response signal generator, said response signal generator determining if said barrier transaction request is within a domain indicated by said domain indicator by comparing said domain indicator determined from said mark, and if it is not said response signal generator issuing a response signal to said barrier transaction request.

26. Interconnect circuitry according to claim 1, said interconnect comprising a plurality of paths for transmitting said transaction requests between said at least one input and said at least one output, wherein at least some of said plurality of paths are divergent paths diverging from a node said control circuitry being configured to determine a location where at least some of said plurality of paths reconverge and to delay said at least some transaction requests subsequent to said barrier transaction requests at a node before said paths diverge and in response to receiving response signals from all of said reconvergent paths to transmit said delayed at least some transaction requests.

27. Interconnect circuitry according to claim 1, said response signal generator being responsive to receipt of a response signal for a barrier transaction request and to receipt of a further barrier transaction request and to no intervening transactions being received between said barrier transaction request and said further barrier transaction request that are subject to said barrier transaction request to:
 transmit a response signal for both said barrier transaction request and said further barrier transaction request; and
 to cancel said further barrier transaction request and not transmit it further.

28. Interconnect circuitry according to claim 27, wherein said control circuitry is configured to speculatively generate a barrier transaction request such that in response to receipt of a response signal for said generated barrier transaction request and to receipt of a further barrier transaction request and to no intervening transactions being received between said barrier transaction request, said further barrier transaction request can be cancelled.

29. Interconnect circuitry according to claim 27, wherein said control circuitry is responsive to a sleep signal indicating that a location is to enter a low power mode, to generate a barrier transaction request and to send said barrier transaction request and to delay said location from entering said low power mode at least until said response signal is received at an entry node to a bisection path connecting to said location.

30. Interconnect circuitry according to claim 29, wherein said location comprises one of said at least one recipient devices, said one of said at least one recipient devices comprising a peripheral device.

31. Interconnect circuitry according to claim 30, said control circuitry being responsive to detection of a barrier transaction request being transmitted to said at least one peripheral device to generate a request signal to a power controller, requesting said at least one peripheral device should enter a low power sleep mode.

32. Interconnect circuitry according to claim 31, wherein said control circuitry is responsive to detecting said at least one peripheral being idle for a predetermined time to generate said barrier transaction request and to send said barrier transaction request to said at least one peripheral.

33. Interconnect circuitry according to claim 1, wherein said at least some transaction requests comprise all transaction requests within said stream of transaction requests.

34. Interconnect circuitry according to claim 1, wherein said barrier transaction request comprises an indicator indicating whether said barrier is a synchronisation barrier or a memory barrier, said interconnect generating said response signal to said synchronisation barrier only in response to detecting completion of all of said at least some transaction requests occurring before said synchronisation barrier.

35. Interconnect circuitry according to claim 1, wherein said control circuitry is configured not to allow said at least some transaction requests that occur after at least one of said barrier transaction requests to overtake said at least one of said barrier transaction requests and not to allow said at least one of said barrier transaction requests to overtake said at least some transaction requests that occur in front of said at least one of said barrier transaction requests in said stream of transaction requests and said response signal generator is responsive to receipt of said at least one barrier transaction request not to generate a response signal.

36. Interconnect circuitry according to claim 35, wherein said at least one barrier transaction request comprises an indicator indicating that it is a non-blocking barrier transaction request.

37. Interconnect circuitry according to claim 1, wherein said control circuitry is configured not to allow said barrier transaction request to overtake said at least some transaction requests that occur in front of said barrier transaction request in said stream of transaction requests.

38. Interconnect circuitry according to claim 37, wherein at least some of said barrier transaction requests comprise a blocking indicator indicating that said at least some transactions subsequent to said barrier transaction request have been delayed.

39. Interconnect according to claim 38, wherein said barrier transaction request comprises a memory barrier indicator and said control circuitry is configured to duplicate barrier transactions at a divergent node at an entry to a reconvergent region and to provide said duplicated barrier transactions with said blocking indicator and to block subsequent transaction requests until receipt of responses from at least one of said duplicated barrier transactions.

40. Interconnect according to claim 38, wherein said barrier transaction request comprises a memory barrier indicator and said control circuitry is configured to duplicate barrier transactions at a divergent node at an entry to a cross coupled region and to provide said duplicated barrier transactions with said blocking indicator and to block subsequent transaction requests until receipt of responses from at least one of said duplicated barrier transactions on exit of said cross coupled region, said control circuitry being further configured to delete said blocking indicator from said duplicated barrier transactions on exit of said cross coupled region.

41. Interconnect according to claim 38, said control circuitry being responsive to said barrier transaction comprising a memory barrier indicator and no blocking indicator to transmit said subsequent transactions further without requiring any response from said barrier transaction.

42. An initiator device for issuing transaction requests to a recipient device via an interconnect, comprising:
a barrier transaction request generator for generating barrier transaction requests indicating to said interconnect that an ordering of at least some transaction requests within a stream of transaction requests passing through said interconnect should be maintained by not allowing reordering of at least some of said transaction requests that occur before said barrier transaction request in said stream of transaction requests with respect to at least some of said transaction requests that occur after said barrier transaction request; wherein
said barrier transaction request generator is configured to provide said generated barrier transaction requests with a blocking or a non-blocking indicator;
said initiator device configured to, in response to said barrier transaction request generator generating said barrier transaction request with said blocking indicator, not issue said at least some transaction requests that occur after said barrier transaction request to said interconnect until said initiator device has received a response to said blocking barrier transaction request; and said initiator device configured to, in response to said barrier transaction request generator generating said barrier transaction request with said non-blocking indicator, issue said at least some transaction requests that occur after said barrier transaction request to said interconnect.

43. A recipient device for receiving transaction requests from an interconnect, said recipient device comprising a response signal generator, said response signal generator configured to, in response to receiving a barrier transaction request comprising a blocking indicator, send a response to said barrier transaction request; and to, in response to receiving a barrier transaction request comprising a non-blocking indicator, discard said barrier transaction request and not send a response.

44. A data processing apparatus comprising an initiator device for issuing transaction requests, a recipient device for receiving said transaction requests and an interconnect for routing said transaction requests from said initiator device to said recipient device, said initiator device comprising:
a barrier transaction request generator for generating barrier transaction requests indicating to said interconnect that an ordering of at least some transaction requests within a stream of transaction requests passing through said interconnect should be maintained by not allowing reordering of at least some of said transaction requests that occur before said barrier transaction request in said stream of transaction requests with respect to at least some of said transaction requests that occur after said barrier transaction request; wherein
said barrier transaction request generator is configured to provide said generated barrier transaction requests with a blocking or a non-blocking indicator;
said initiator device being configured:
in response to said barrier transaction request generator generating said barrier transaction request with said blocking indicator not to issue said at least some transaction requests that occur after said barrier transaction request to said interconnect until said initiator device has received a response to said blocking barrier transaction request; and
in response to said barrier transaction request generator generating said barrier transaction request with said non-blocking indicator to issue said at least some transaction requests that occur after said barrier transaction request to said interconnect; and
said recipient device comprising a response signal generator, said response signal generator being configured in response to receiving a barrier transaction request comprising a blocking indicator to send a response to said barrier transaction request; and in response to receiving a barrier transaction request comprising a non-blocking indicator to discard said barrier transaction request and not to send a response; and
said interconnect comprising an interconnect according to claim 38.

45. A method for routing data from at least one initiator device to at least one recipient device via interconnect circuitry, said method comprising:
receiving transaction requests from said at least one initiator device at at least one input;
transmitting said transaction requests along at least one of a plurality of paths towards at least one output; and in response to receipt of a barrier transaction request at a response signal generator, issuing a response signal to said barrier transaction request, said response signal indicating to upstream blocking circuitry that any transaction requests delayed in response to said barrier transaction request can be transmitted further.

* * * * *